(12) United States Patent
Tiwari et al.

(10) Patent No.: US 11,532,145 B2
(45) Date of Patent: Dec. 20, 2022

(54) MULTI-REGION IMAGE SCANNING

(71) Applicant: MICROSOFT TECHNOLOGY LICENSING, LLC, Redmond, WA (US)

(72) Inventors: Onkar Nath Tiwari, Hyderabad (IN); Sachin Talreja, Hyderabad (IN); Abhishek Agarwal, Hyderabad (IN); Praveen Upadhyay, Hyderabad (IN); Rahul Bhuptani, Hyderabad (IN); Mahesh Sridharan, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/241,904

(22) Filed: Jan. 7, 2019

(65) Prior Publication Data
US 2020/0218924 A1  Jul. 9, 2020

(51) Int. Cl.
| G06V 10/20 | (2022.01) |
| G06T 7/12 | (2017.01) |
| G06T 7/13 | (2017.01) |
| G06V 10/44 | (2022.01) |
| G06V 10/26 | (2022.01) |

(52) U.S. Cl.
CPC .............. *G06V 10/255* (2022.01); *G06T 7/12* (2017.01); *G06T 7/13* (2017.01); *G06V 10/267* (2022.01); *G06V 10/44* (2022.01)

(58) Field of Classification Search
CPC .... G06K 9/3241; G06K 9/4604; G06K 9/342; G06T 7/13; G06T 7/12
USPC ........................................................ 382/103
See application file for complete search history.

(56) References Cited

U.S. PATENT DOCUMENTS

| 5,668,636 | A | | 9/1997 | Beach et al. |
| 5,880,858 | A | | 3/1999 | Jin |
| 6,151,426 | A | * | 11/2000 | Lee ..................... H04N 1/3872 |
| | | | | 382/319 |
| 6,178,270 | B1 | | 1/2001 | Taylor et al. |
| 7,778,457 | B2 | | 8/2010 | Nepomniachtchi et al. |
| 7,885,463 | B2 | | 2/2011 | Zhang et al. |
| 8,345,106 | B2 | | 1/2013 | Nijemcevic et al. |
| 8,971,587 | B2 | | 3/2015 | Macciola et al. |
| 9,177,218 | B2 | | 11/2015 | Fechter |
| 9,430,843 | B2 | | 8/2016 | Mudge |
| 9,443,314 | B1 | | 9/2016 | Huang et al. |
| 9,754,163 | B2 | | 9/2017 | Segalovitz et al. |

(Continued)

FOREIGN PATENT DOCUMENTS

EP            0991264 A2     4/2000

OTHER PUBLICATIONS

"What is Office Lens?", Retrieved from https://support.office.com/en-us/article/what-is-office-lens-f5f6b88d-356M037-b7e8-49f34be86db3, Retrieved on Jan. 10, 2019, 5 Pages.

(Continued)

*Primary Examiner* — Amandeep Saini
(74) *Attorney, Agent, or Firm* — NovoTechIP International PLLC

(57) ABSTRACT

An image captured by a camera can be processed by a scanning application to identify multiple regions within the image that are suitable for scanning. These regions can be detected and selected for scanning automatically. The captured regions for the single image can be stored as individual image content files.

20 Claims, 22 Drawing Sheets

(56) References Cited

U.S. PATENT DOCUMENTS

| | | |
|---|---|---|
| 10,902,277 B2 | 1/2021 | Agarwal et al. |
| 2003/0044086 A1* | 3/2003 | Jia .................... H04N 1/3873 |
| | | 382/296 |
| 2003/0113033 A1 | 6/2003 | Huang |
| 2004/0120009 A1 | 6/2004 | White et al. |
| 2009/0034791 A1* | 2/2009 | Doretto ............. G06K 9/4614 |
| | | 382/103 |
| 2014/0064623 A1* | 3/2014 | Kang ................. G06V 10/25 |
| | | 382/195 |
| 2014/0126811 A1* | 5/2014 | Ihara ................. G06V 10/24 |
| | | 382/165 |
| 2015/0220257 A1 | 8/2015 | Moore et al. |
| 2016/0086039 A1* | 3/2016 | Diot ..................... G06T 7/11 |
| | | 382/103 |
| 2017/0061227 A1 | 3/2017 | Sharma et al. |
| 2017/0237875 A1* | 8/2017 | Negami ............ H04N 1/00718 |
| | | 358/488 |
| 2020/0043190 A1* | 2/2020 | Tanner .................. G06T 5/002 |

OTHER PUBLICATIONS

Sharma, et al., "Feature Extraction and Simplification from Colour Images Based on Colour Image Segmentation and Skeletonization using the Quad-Edge Data Structure", In Proceedings of the 15th International Conference in Central Europe on Computer Graphics of Short Communications, Jan. 29, 2007, 8 Pages.

"International Search Report and Written Opinion Issued in PCT Application No. PCT/US19/068882", dated Mar. 18, 2020, 11 Pages.

Ye, et al., "Color Image Segmentation using Density-Based Clustering", In Proceedings of IEEE International Conference on Acoustics, Speech, and Signal Processing, Apr. 6, 2003, pp. 401-404.

\* cited by examiner

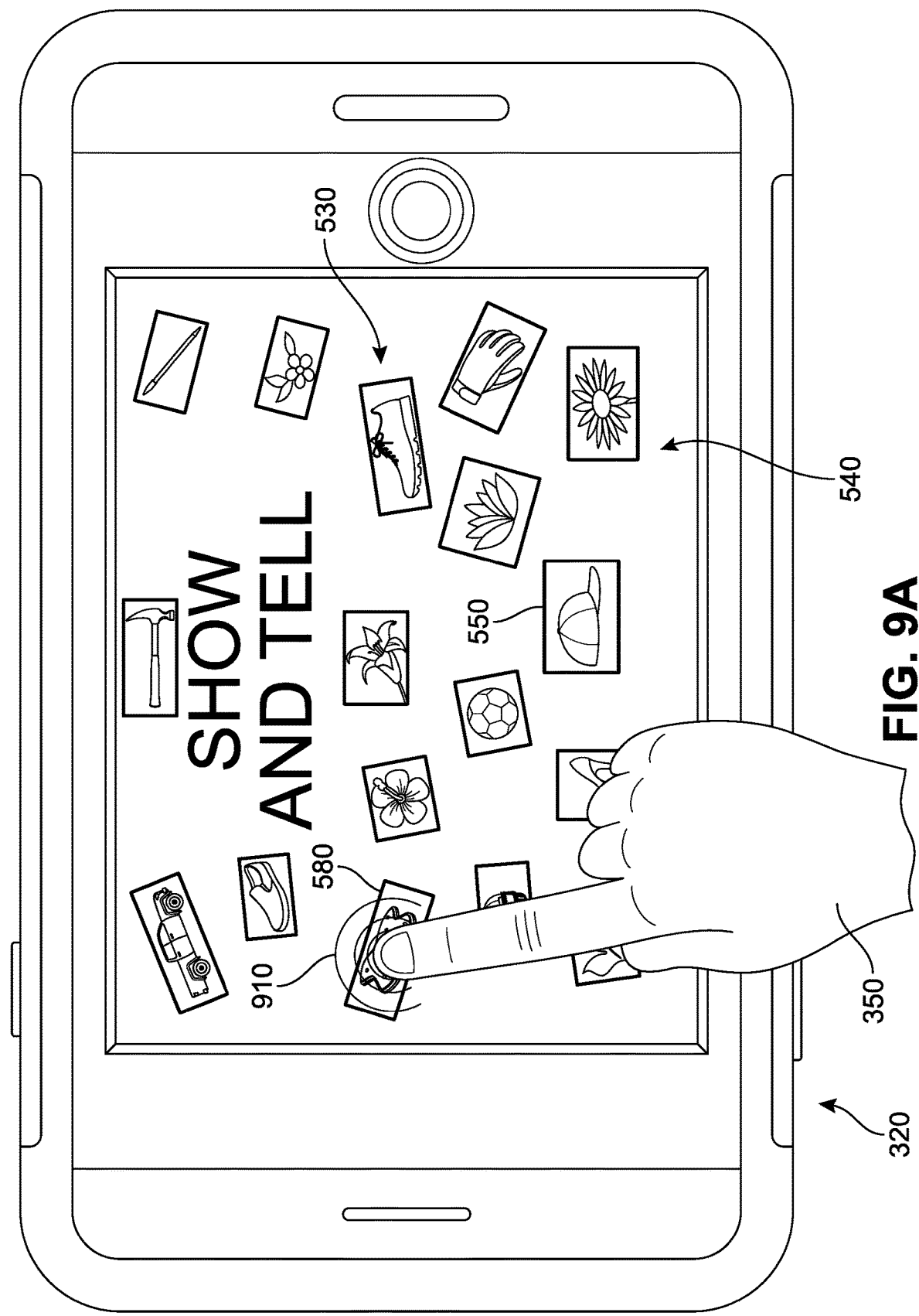

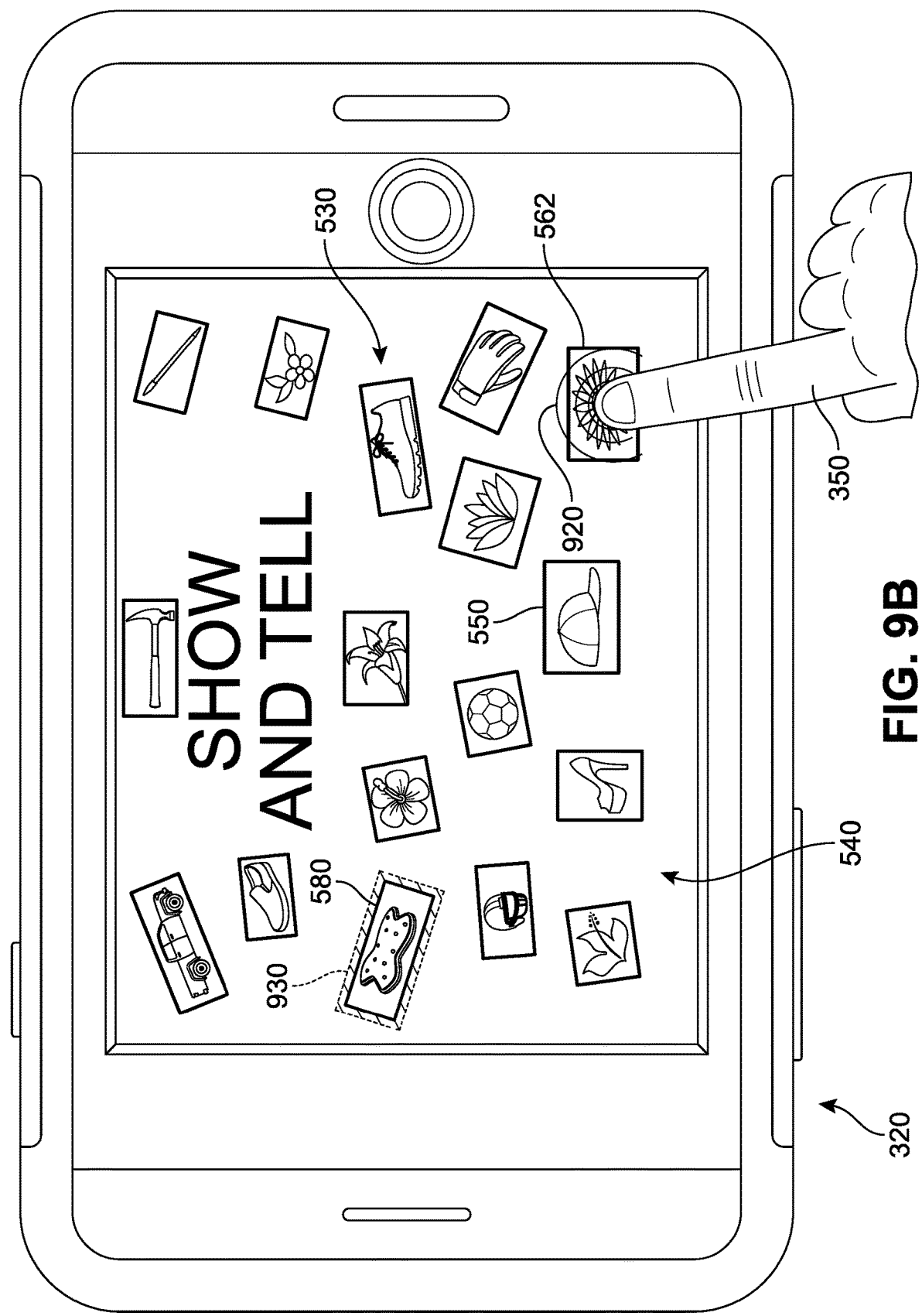

MULTI-REGION IMAGE SCANNING

BACKGROUND

Computing devices that include cameras are increasingly more common in mobile devices, including laptop computers, tablets, digital cameras, smartphones, as well as other mobile data, messaging, and/or communication devices. Generally, users make use of cameras associated with computing devices to take various pictures, such as images of scenery, persons, presentations, whiteboards, business cards, documents, sketches, paintings, and so forth. The users can refer to the captured images to recall information contained therein such as diagrams, pictures, lists and other text, and/or to electronically deliver them to other users, storage services, or devices. However, extracting specific regions in an image to obtain electronically usable and/or editable information via scanning remains challenging.

In addition, because a photo is typically fairly large in size and includes abundant textual and graphical information, the image region automatically selected for capture by the device may not be the one desired by the user and/or there may be multiple regions of interest in a single image. Recognition of the particular portion of an image that includes all of the user's items of interest has remained both inefficient and error prone. Thus, there remain significant areas for new and improved ideas for the efficient scanning of images, as well as the management of the image region detection and selection process for a user.

SUMMARY

A data processing device, in accord with a first aspect of this disclosure, includes at least one processor and one or more computer readable media. The computer readable media include instructions which, when executed by the at least one processor, cause the at least one processor to receive an image via an image scanning application, as well as to automatically detect a plurality of discrete candidate regions in the image. Furthermore, the instructions cause the at least one processor to identify a subset of the plurality of discrete candidate regions for scanning, the subset including a first region and a second region, and to receive a signal for initiating scanning of at least the first region and the second region. In addition, the instructions cause the at least one processor to capture, in response to the signal, at least the first region and the second region in a substantially parallel process, and to store at least a first image content corresponding to the first region and a second image content corresponding to the second region in a scanned images folder.

A method, in accord with a second aspect of this disclosure, includes receiving an image via an image scanning application, and automatically detecting a plurality of discrete candidate regions in the image. Furthermore, the method includes identifying a subset of the plurality of discrete candidate regions for scanning, the subset including a first region and a second region, and then receiving a signal for initiating scanning of at least the first region and the second region. In addition, the method involves capturing, in response to the signal, at least the first region and the second region in a substantially parallel process, and then storing at least a first image content corresponding to the first region and a second image content corresponding to the second region in a scanned images folder.

A data processing system, in accordance with a third aspect of this disclosure, includes means for receiving an image via an image scanning application, and means for automatically detecting a plurality of discrete candidate regions in the image. In addition, the system includes means for identifying a subset of the plurality of discrete candidate regions for scanning, the subset including a first region and a second region, as well as means for receiving a first signal for initiating scanning of at least the first region and the second region. Furthermore, the system includes means for capturing, in response to the first signal, at least the first region and the second region in a substantially parallel process, and means for storing at least a first image content corresponding to the first region and a second image content corresponding to the second region in a scanned images folder.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 9A and 9B are display diagrams illustrating an implementation of a user interface for an application configured to provide scanning tools where a first user input and a second user input causes two regions to be selected for scanning;

DETAILED DESCRIPTION

Figure 1A:
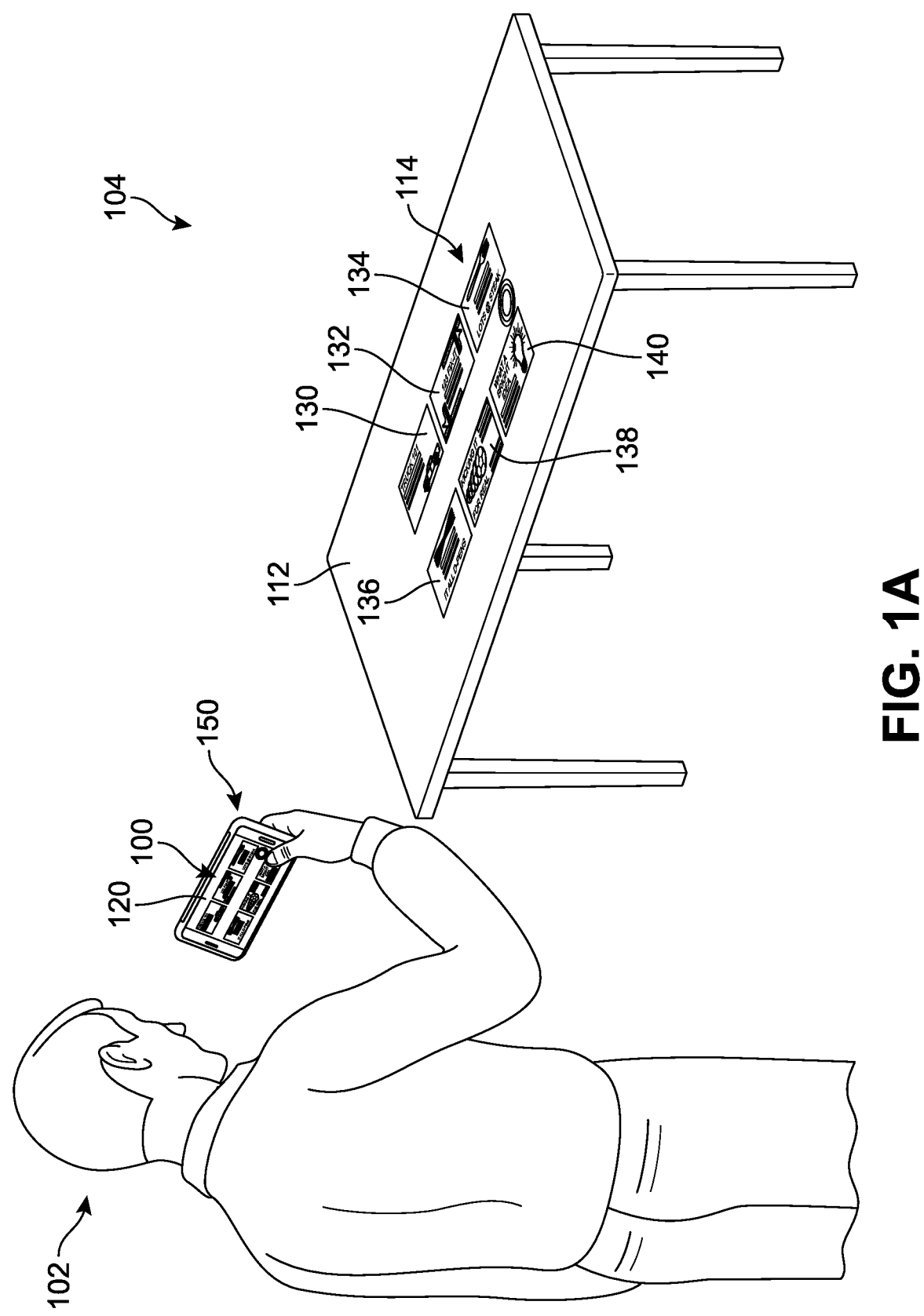
FIGS. 1A and 1B each illustrate an implementation of an image scanning application and environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a scan application toolbox that may enhance the user scanning experience by providing automatic detection of all potential scannable regions in an image. In order to identify a region for scanning, some applications may detect what is referred to as a "quad" or quadrangular-shaped region. In some cases, a quad represents a document or other object where any other scene artifacts or background are dropped or removed. However, traditional scanning-based applications often designate undesirable quadrangular regions in images, or fail to detect the regions that are desired by the user. Furthermore, in cases where there are multiple quads that may be detected in an image, users must make several attempts to obtain all of the quads the user had intended to capture. Traditionally, the scanning workflow has included a series of steps where a user can: (1) point a camera at a real-world scene; (2) take a photo; (3) crop or drag the document or other object boundaries to more precisely surround the object of interest; (4) clean up the selected image content (filter, perspective correction, etc.) and; (5) save the file and/or share the scanned item. With respect to acquiring multiple objects of interest in a single real-world scene, users must repeat the above steps, and attempt to guide the application toward detecting the next region of interest in the same scene but not yet been captured. This process can quickly become tiresome and repetitive. The disclosed implementations allow a user to view previously captured (static) images and/or an image captured in real-time (live) via a scanning application and without further user input shown all available scanning candidate regions in the scene, as automatically detected by the application. The ability to quickly and effectively direct an application to capture multiple portions of an image for scanning can allow users to increase workflow efficiency when dealing with electronic content. Furthermore, this system can offer users a broader awareness of the existence or availability of multiple distinct regions of scannable image content while viewing the larger image.

As introduced above, various applications can be used to capture and/or edit digital images or electronic content. Generally, the term "electronic content" or "image" includes any digital data that may be visually represented, including but not limited to an electronic document, a media stream, real-time video capture, real-time image display, a document, web pages, a hypertext document, any image, digital video or a video recording, animation, and other digital data. As an example, this electronic content may include image capture and photo scanning applications, or other software configured to provide tools for use with digital images.

Furthermore, within some types of documents, the electronic content can be understood to include or be segmented into one or more units that will be referred to as image content regions ("content regions"), or more simply, regions. In general, the term "region" describes portions of digital content that are identifiable and/or selectable as distinct or discrete segments of an image. As an example, one collection of electronic content (such as a digital photograph) can be characterized as or by a plurality of regions that may each include one or more image content portions ("content portions"). In different implementations, a first image content region may overlap with a portion of another, second image content region in the same image. Thus, a content region includes any part of an electronic content that may be defined or discernable by the system. For example, a content region may be automatically discerned from a characteristic of the content portion itself or relative to other content portions (e.g., a color, luminosity level, an edge detection, shape, symbol, pixel), or may be manually defined by a reviewer or end-user (e.g., selected set of pixels or object), or any other selected portion of a digital image.

Furthermore, an end-user (or "user") in one example is one who captures, edits, views, manages, or deletes pieces of electronic content, including the creation, viewing, or updating of selected regions in the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include photography software, image capture/editing applications, word processors, spreadsheets, slideshows, presentation design applications, accounting systems, and telecommunication programs, as well as gaming software, utility and productivity tools, mobile applications, presentation graphics, and other productivity software.

The software application that may incorporate the disclosed features can be installed on a client's device, or be associated with a third-party application, such as a webbrowser application that is configured to communicate with the device. These devices can include, for example, desktop computers, mobile computers, mobile communications devices (such as mobile phones, smart phones, tablets, etc.), smart televisions, gaming devices, set-top boxes, and/or any other computing devices that include a camera and/or an image-display capability.

Generally, such scanning applications permit end-users to scan documents, presentations, real-world objects, and other subjects using images captured by a camera associated with the device or via images stored or accessed from memory. Furthermore, in some implementations, camera-based scanning applications can be configured to correct for the effects of perspective on rectangular or other polygonal objects such as paper, business cards, whiteboards, screens, and so forth. In different implementations, software applications such as programs offered in the Microsoft Office Suite® (e.g., Office Lens®, Powerpoint®, Visio®) and other applications can offer a variety of image capturing and editing tools, including scanning and identification of different regions in an image. Other examples include Microsoft Safety Scanner®, VueScan®, Picasa®, TWAIN®, Windows Fax and Scan®, PaperPort®, SilverFast®, Genius Scan®, TurboScan®, Scanner Pro®, Prizmo®, Google PhotoScans® and Helmut Film Scanner®, Google Drive®, Evernote Scannable®, Dropbox®, Scanbot®, CamScanner®, Photomyne®; these are non-limiting examples, and any other electronic content editing or viewing application may benefit from the disclosed implementations.

During the scanning of an image, end-users can be slowed or hindered in cases where there are multiple potential regions available for scanning. As one example, scan or scanning refers to the mechanism by which an application identifies, selects, isolates, or otherwise determines a boundary for a particular region in an image that may be of interest to a user. Thus, scanning may occur in real-time (e.g., while a camera is pointed at a scene or object(s)) and/or following the capture, generation, or storing of an image or video in memory, and may be understood to permit a high-resolution capture of a particular region within an image. In other words, scanning can in some implementations involve the capture of a smaller region within a larger, captured image.

The following implementations are configured to provide users with the ability to detect multiple scanning candidate regions in a single image. In some implementations, if multiple quads are available or detected in an image, a finger tap by a user in an area associated with the desired quad can be configured to help determine boundaries (i.e., a perimeter) of a potential quad associated with the 'tapped' region. Such an application enables users to capture one or multiple quads of their choice. Thus, in different implementations, a user can aim a camera of a portable device towards a subject and initiate a capture or recording of an image of the subject using a button, voice command, touch, stylus, mouse, direction keys, and/or other suitable input devices. Alternatively a user can access an image from memory. When the scene is received by the application, a scanning operation can occur to detect regions of the real-world scene. The image selection can initiate various processing of the image to detect all potential scannable regions and present these regions to the user and/or proceed to capture each region as a separate, discrete image content file.

Figure 1B:
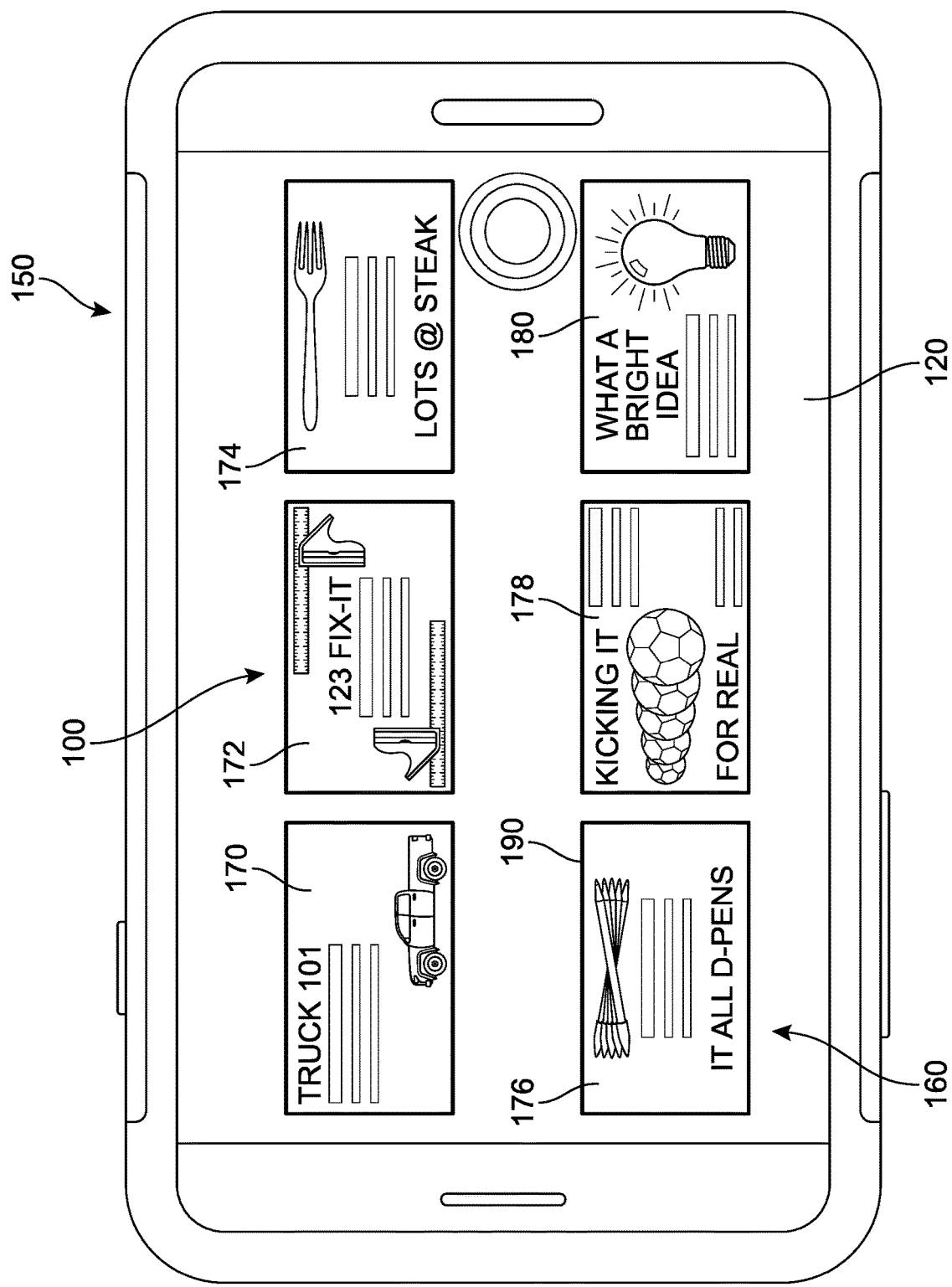
Figure 2:
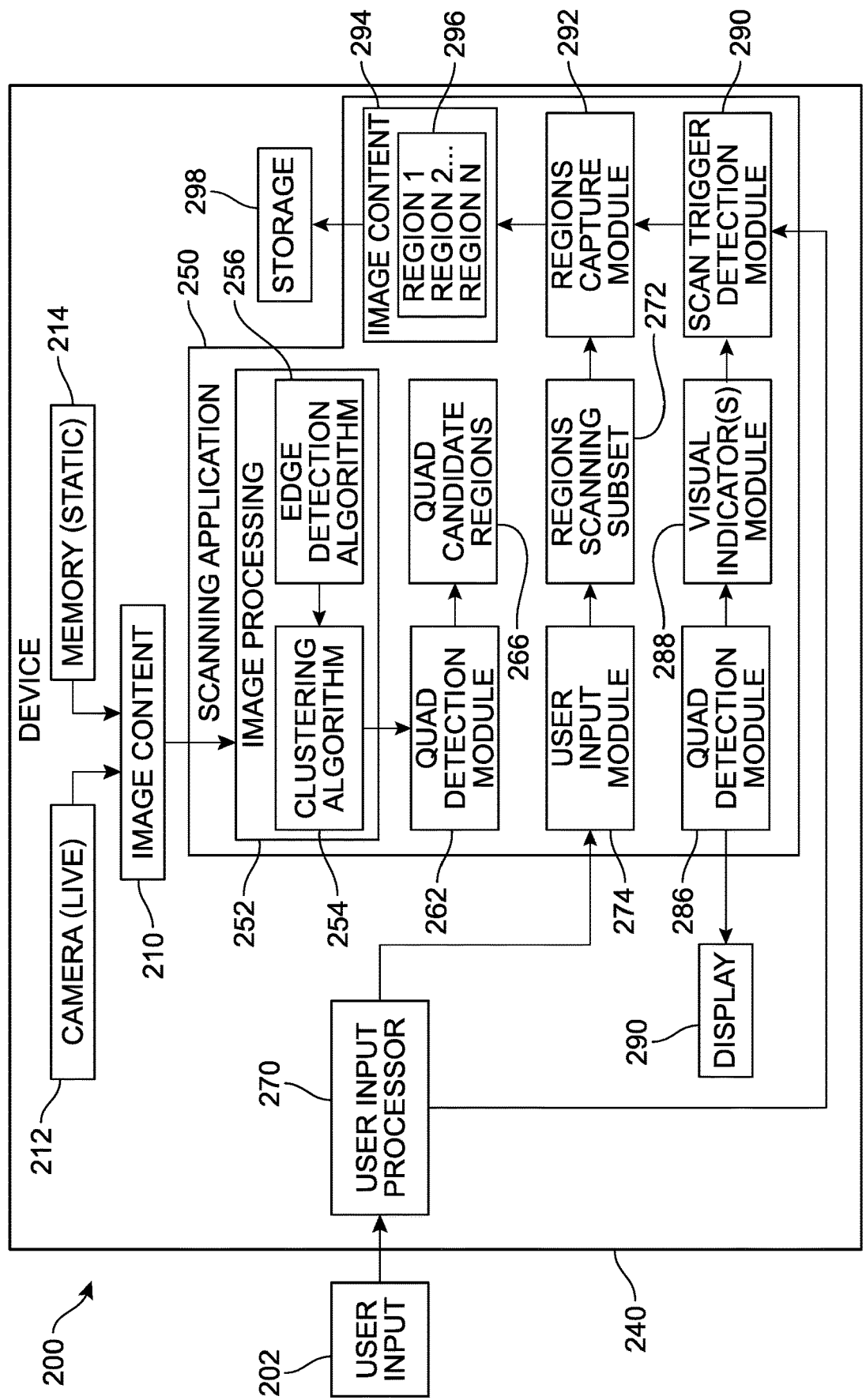
FIG. 2 is a conceptual diagram illustrating one implementation of a distributed computing environment for managing regions in an image for scanning.

In order to better introduce the systems and methods to the reader, FIGS. 1A and 1B present an example of a representative region selection and detection scanning environment for implementing a multi-region scanning system (the system is illustrated schematically in greater detail in FIG. 2). In different implementations, the environment can include a plurality of computing device end-users, or simply "users" who can capture, view, edit, and/or modify the image (for example a first user, a second user, a third user, etc.). One or more users can interact with or manipulate the image presented via a user device. As users view an electronic content such as an image, various regions of the image may be detected or otherwise identified as being potentially scannable (i.e., candidate regions). In one implementation, a user may wish to identify multiple scannable regions in a single image.

In FIG. 1A, a first user 102 holds a first computing device ("first device") 150 oriented toward a first real-world scene ("first scene") 104. The first scene 104 comprises a table 112 upon which a plurality of objects 114 are arranged. In this example, each object can be understood to represent a business card or other individual information sets related to various persons or organizations. Each object, here including a first object 130, a second object 132, a third object 134, a fourth object 136, a fifth object 138, and a sixth object 140, is separate and distinct from the other objects. The first device 150 includes a display 120, and as a camera optical lens associated with the first device 150 is pointed toward the table 112, a first image preview ("first image") 100 is presented on the display 120 via an image scanning application. The first image 100 can be associated with any type of digital media file, as described above.

As shown in FIG. 1B, first image 100 is being previewed on the display 120 as a digital image frame that includes a plurality of image sectors or candidate regions 160, including a first region 170 (corresponding to first object 130), a second region 172 (corresponding to second object 132), a third region 174 (corresponding to third object 134), a fourth region 176 (corresponding to fifth object 136), a fifth region 178 (corresponding to fifth object 138), and a sixth region 180 (corresponding to sixth object 140). An image sector or candidate region may be understood to refer to a potential or possible scannable region. Each sector is represented here by a small rectangular shape (quadrangle or "quad"). However, in other implementations, the sector may be defined by other regular shapes, such as triangles, circles, pentagons, and different geometric outlines, or other irregular shapes. While only six sectors are depicted for purposes of this example, an image can include any number of sectors. In addition, for purposes of simplicity in this case, each sector or quad corresponds to a separate item in the real-world.

In some but not all implementations, the display 120 can be configured to receive data from the camera that is associated with the first device 150 to present a live preview of the items or objects in the camera's field of view through an image capture or image scanning application. In one implementation, as noted above, the application can also offer a graphical user interface in conjunction with the image preview, referred to herein as an image content viewing interface ("interface"). In some implementations, the interface can be presented 'full-screen' on the display 120 or on only a portion of the display 120. In addition, in some implementations, the interface may be substantially transparent or translucent, such that user interactions with the screen or image are received as inputs by the application while the image itself remains mostly visible without superimposition of additional interface graphics that would otherwise obstruct view of the image. However, in other implementations, the image capture application can present a variety of graphical elements in association with, overlaid on, or adjacent to the image, such as visual indicators, a menu, settings, or other options.

Generally, the term "interface" should be understood, to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, such as a finger tap, keyboard command, voice command, or mouse-click, which can trigger a change in the display or functioning of the application or device.

In some other implementations, the interface associated with the image capture application can be configured to display or present various indicators to guide a user to any scannable regions that have been detected in the image. For example, the user interface may be configured to display or present a visual cues or symbols, or other actuatable options, that can permit a user to easily navigate through any detected regions and/or simply alert a user that multiple or alternative candidate regions available in the same image. In some implementations, the detected regions can be highlighted or presented in a substantially simultaneous manner such that the user can view all candidate regions in the image at once. In other implementations, the application may only detect the regions that are most likely to represent the desired objects for scanning, and/or detect alternative or additional (secondary) regions if, for example, the user subsequently provides some sort of input that corresponds to a request for detection of other less probable region(s).

Furthermore, the application can incorporate the functionality of the device 150 to implement camera-based scanning techniques that are described herein. The interface 190 is illustrated as a viewfinder that can present current images from the camera and/or switch to present a captured image (i.e., from memory) when a picture has been taken or is being accessed from storage. In addition, in some implementations, a user may be able to modify and/or select portions of a captured image through interaction with the viewfinder portion of the display 120.

In FIG. 1B, each region is associated with or corresponds to a particular feature, object, or area in the first scene 104 of FIG. 1A. In different implementations, the boundary associated with the detected region is highlighted or otherwise differentiated to alert a user of that a region has been detected and/or is currently selected for scanning. In FIG. 1B, each of the regions 160 have been automatically detected and are identified by a visual indicator 190 (here represented by a bold or thick line surrounding a boundary of each of the regions 160). However, it may be appreciated that in many cases, a user may desire the selection of a different set of candidate regions than the regions identified by the application. As will be discussed below with respect to FIGS. 7A-9B, in different implementations, the system can include provisions to receive input from a user that indicates which regions are desired for inclusion (or exclusion) in the upcoming scanning operation.

In this case, it can be assumed that the user is content with the set of candidate regions as identified by the system. Accordingly, either automatically following a pre-set period of time in which no input or changes are made, and/or an input by the user corresponding to a request for the scanning operation to commence, the system can proceed with a multi-region scanning operation. As will be described in greater detail below, the six regions 160 may therein be selected simultaneously for scanning and each captured as a discrete file. This process can greatly decrease the time needed to collect desired content from an image. Rather than requiring a user to re-take a photo, crop the photo, zoom-in, focus, adjust lighting conditions, increase contrast, or manipulate other image parameters in attempts to 'coax' the application to individually detect all of the desired regions, the user is able to point the camera (or access a saved image), and the application can automatically detect all of the candidate regions that are available for scanning.

Referring now to FIG. 2, an example of a representative architecture of a multi-region detection scanning system ("system") 200 is depicted. In different implementations, the system 200 can be configured to present user interfaces for display of electronic content and identification of scannable regions. The system 200 can be farther configured to update the scanning set of candidate regions based on user input. It is to be understood that the system 200 presented here is merely an example implementation, only some aspects are presented for purposes of clarity, and that a wide variety of other implementations are possible.

In FIG. 2, the system 200 includes a device 240. The device 240 can include any type of device capable of presenting image and/or image-related content, such as cameras, mobile phones, tablets, laptops, desktops, gaming devices, projectors, and other such devices. The device 240 can include a wide variety of hardware and software components. While a scanning application 250 is illustrated as being locally installed on the device 240 in this example, in other implementations, some or all aspects or features of the scanning application 250 may be accessed from another device or accessed from cloud storage computing services.

In different implementations, the scanning application 250 is configured to receive image content 210 via the device 240. The image content 210 may have been previously captured or 'static'—accessed from a memory 214 (local, external, or cloud-based memory)—or can be a 'live' image 212 and be currently framed or captured in real-time (e.g., in anticipation of the scanning operation). The image content 210 can be received by the scanning application 250 via an image processing module 252, which is configured to process the data of image content 210 and detect portions of the image that correspond to approximately or substantially quadrangular-shaped objects, in particular, the image processing module 252 can be configured to identify quadrangles within the image that can be characterized as potential regions for scanning. These quadrangles can be detected using a variety of feature extraction techniques suitable to find arbitrary shapes within images and other documents.

In some implementations, the image processing module includes a clustering algorithm or other image segmentation processor 254. As will be discussed below with reference to FIG. 5A, the image segmentation processor 254 can apply a variety of statistical techniques to determine whether a given pixel is to be classified as a foreground pixel or a background pixel. In one implementation, the segmentation algorithm can output a set of per-pixel probability data, representative of whether each pixel is likely to be a foreground or background pixel. The pixel probability data can be further processed by a global binary segmentation algorithm which can use the pixel probability data as a data term to segment the image into a segmented image, in some implementations (see FIG. 5A) the image segmentation processor 254 can also associate segmentation indicators (e.g., labels of foreground, background) from with the pixels of the input image. These segmentation indicators can be used to modify and/or process the input image to produce an output image that will be conveyed to an edge detector 256.

In other implementation, additional pre-processing may occur prior to edge detection. For example, the system can be configured to applying image filters, enhancing contrast, adjustments to brightness, down scaling, grayscale conversion, median filtering, and other types of filters. In some implementations, pre-processing can also include one or more of down-scaling of the image, contrast enhancement, and noise filtering. The down-scaling can help reduce a resolution of the image and the number of pixels that will have to be processed. As resolution in an image is increased, more computing resources are consumed to process the image and more false (e.g., unwanted) edges can result from edge detection. Accordingly, down-scaling can speed up processing and enable improved edge detection. Furthermore, in another implementation, contrast enhancement can be employed to set the lightest tones in the image to white and the darkest tones to black. This can also improve detection of edges and lines through detection algorithms that find sharp differences in contrast and/or brightness. In some implementations, noise filtering techniques that preserve edges, such as bilateral and/or median filtering, can also be employed.

As noted above, in different implementations, the system can employ one or more edge detection models to evaluate the output image content from the image segmentation processor 254. The edge detector 256 includes or otherwise makes use of an edge detector model or algorithm operable to detect edges based upon visual differences, such as sharp changes in brightness. When edges have been identified, the edges may be joined into connected lines to form quadrangles. For instance, vertices (corners) can be identified through the edge detection and then the vertices can be connected to form quadrangles. This can involve, for example, correcting for imperfections in the detected edges and derivation of lines corresponding to the edges. Accordingly, a set of potential quadrangles can be derived using the detected edges and lines, where the lines are detected from similarly-oriented edges along a particular direction and are then combined to form the quadrangles. The application of the edge detector 256 on the clustered (output) image content can significantly reduce processing time and make more efficient use of computing resources. By first identifying the foreground pixels or clusters in the image, the edge detector 256 can benefit from the receipt of image content that has been pre-processed. Rather than running an edge detector across all of the pixels of the image, the clusters can focus and shorten the quadrangular search and detection process.

As a next step, in some implementations, the processed image content can be conveyed to a quad detection module 262. The quad detection module 262 can review the data shared by the image processing module 252, and identify which edges and quadrangles should be designated for scanning in this image. The identified regions are submitted to a quad candidate regions component 266, and will comprise the regions that will be targeted for scanning in the next step, unless a user modifies the selection. The detected regions can be overlaid by visual indicators via a visual indicator(s) module 288, and submitted to a quad display component 266 for presentation on a device display 290.

In different implementations, the device 240 is further configured to receive user input 202 via a user input processor 270. The user input 202 can vary widely based on the type of input means used. In FIG. 2, the user input 202 can be understood to be associated or correspond with some specific target portion or aspect of the image that is being viewed or accessed by the user. In one implementation, the user input processor 270 can determine whether the input is directed to one of the detected candidate regions. If the user input, received by a user input module 274, specifically selects (or de-selects) a candidate region, the input can be used to modify the proposed regions scanning subset 272. As one example, the user input can include a touch on a touch-screen interface or a mouse-click designating a region that is desired by the user for inclusion (or removal) in the upcoming scanning operation. In response, the set of scanning candidate regions (regions scanning subset 272) will be changed. In one implementation, the changes made by the user reflected by updated visual indicators via the visual indicator(s) module 288, and re-submitted to the quad display component 266 for presentation on the device display 290, confirming to the user that the set has been modified as requested.

Once the candidate regions in the image have been selected for scanning, a trigger (for example, user input, or some passage of time) can signal to a scan trigger detection module 290 that the scanning operation should commence with respect to the specific scanning subset 272. A regions capture module 292 can capture each of the individual regions, and process these regions 296 as separate image content 254 files. The image content for each region can be saved in a storage module 298 for access by other applications or by the user.

Figure 3:
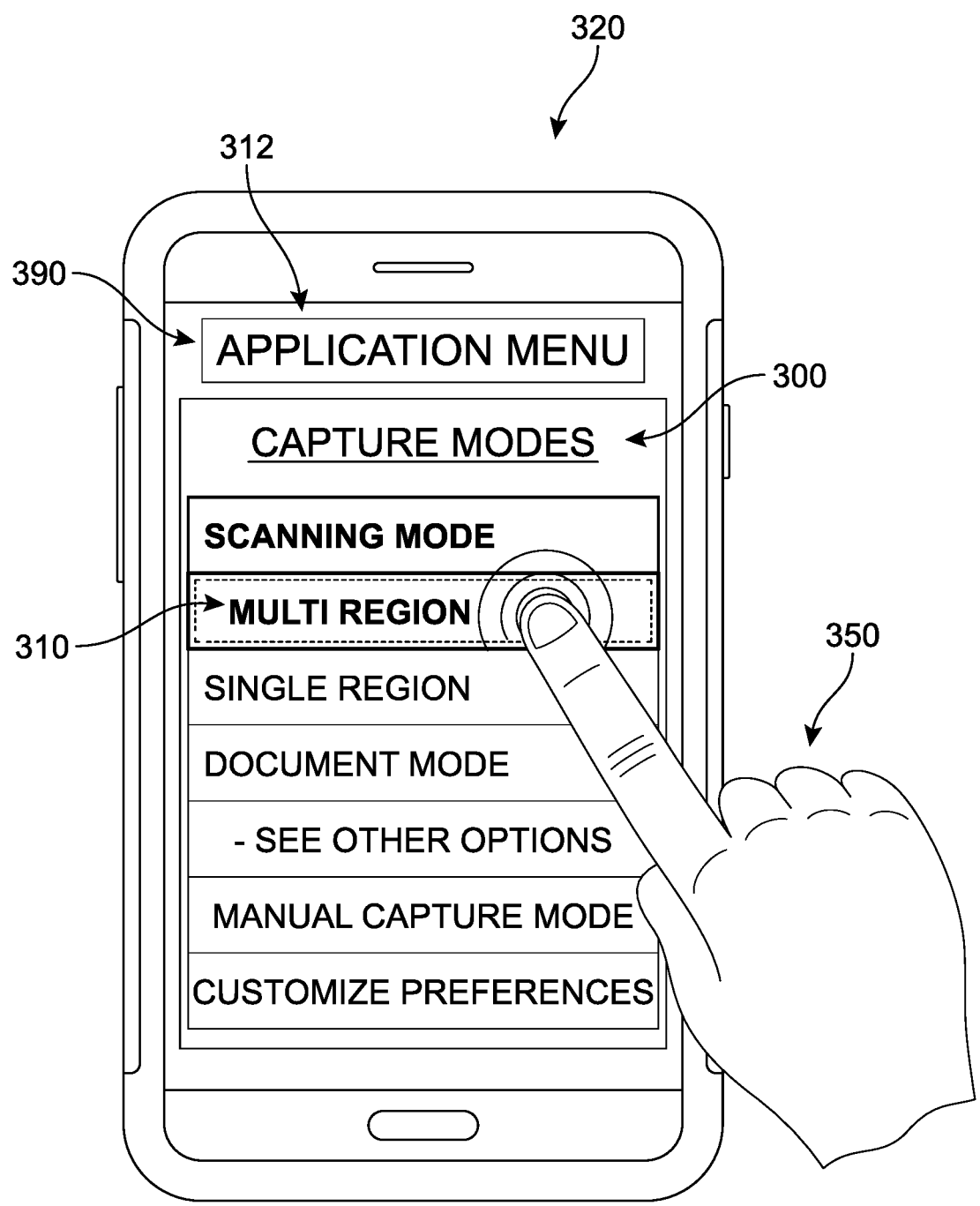
FIG. 3 is a display diagram illustrating an implementation of a user interface for an application configured to provide scanning tools and options.

For purposes of clarity, one implementation of a multiple scannable regions selection process will be presented now with reference to FIGS. 3-6B. In FIG. 3, an image scanning application ("application") 300 is depicted, represented by a graphical user interface (GUI) shown on a display 390 of a second computing device ("second device") 320. In different implementations, the application 300 is used to initiate display of the GUI and various user interface elements, features, and controls to facilitate capturing images via a camera (not illustrated), scanning, and/or processing of images.

In different implementations, the system can include provisions for receiving user inputs and selections in order to establish appropriate settings for the camera and application during particular user sessions. As shown in FIG. 3, for purposes of example, a user is depicted accessing an Application Menu 312 via which several options are offered, including several capture modes. The user navigates through sub-options under a Scanning Mode heading, and selects an option labeled "Multi Region" mode 310. It can be understood that each sub-option can be configured to activate or apply a system configuration that can detect scene changes and stabilizations as well as identify key regions of interest in a manner that corresponds to the selected setting. These modes can be offered to the user upon start-up of the camera operation, be set as a default mode, and/or changed via a remote device linked to the camera settings. While only a few sub-options are presented here, a wide range of other modes are possible, including modes custom-designed by a user.

Figure 4:
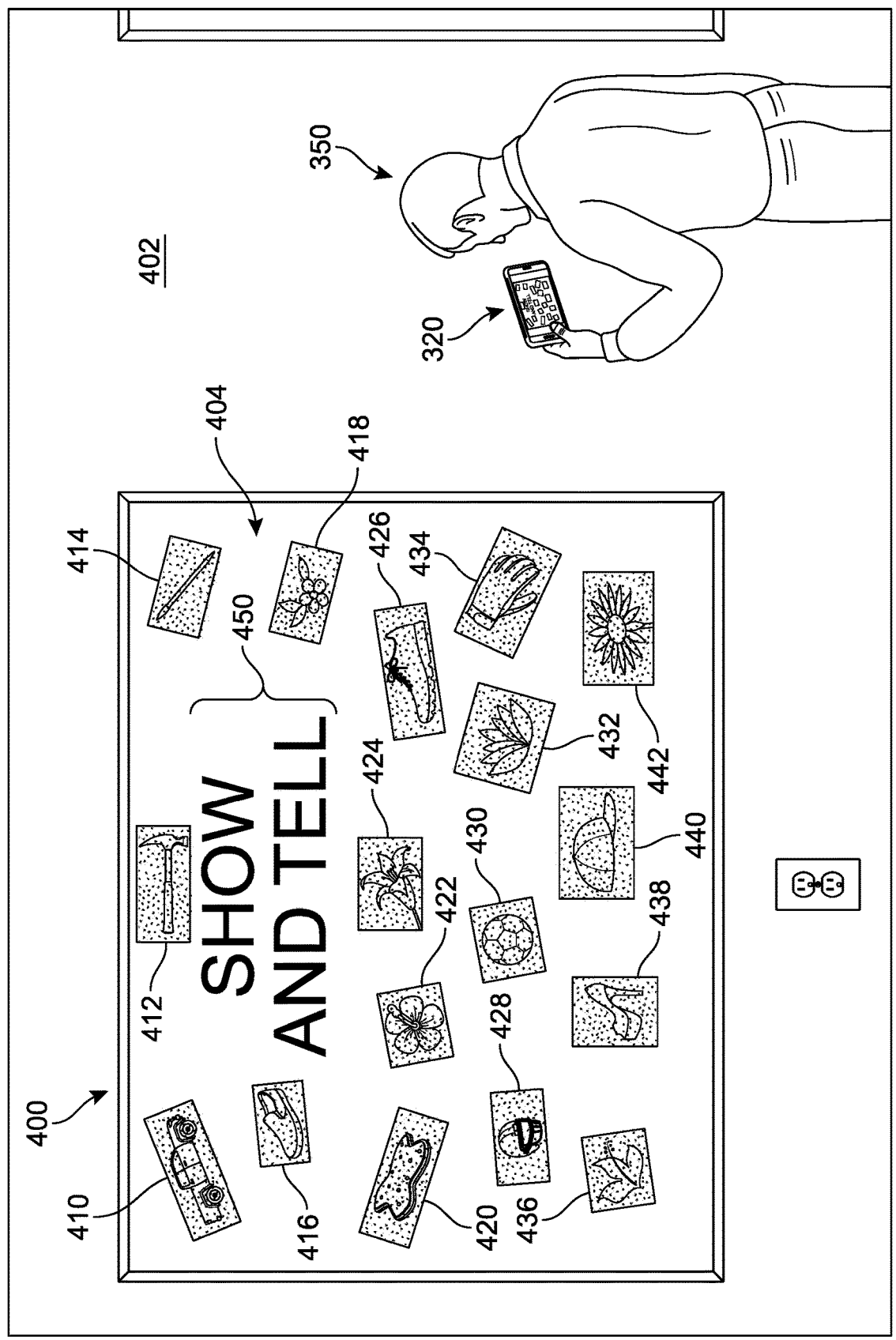
FIG. 4 is an example of a user receiving an image for scanning via a computing device.

Referring next to FIG. 4, a second user 350 is shown observing a second real-world scene ("second scene") 400 that includes a bulletin board 404 on a wall 402. The second user 350 points or directs the camera lens associated with the first device 320 toward a portion of the second scene 400. The targeted portion of the second scene 400 is the bulletin board 404 which is displaying an arrangement of another plurality of objects 406. In this example, each object can be understood to represent a small poster, card, cutout, printout, document, or other individual expression of information. Each object, here including a first object 410, a second object 412, a third object 414, a fourth object 416, a fifth object 418, a sixth object 420, a seventh object 422, an eighth object 424, a ninth object 426, a tenth object 428, an eleventh object 430, a twelfth object 432, a thirteenth object 434, a fourteenth object 436, a fifteenth object 438, a sixteenth object 440, and a seventeenth object 442, is separate and distinct from the other objects. In addition, the second scene 400 includes non-quadrangular objects, such as lettering 450, which includes 13 letters (spelling "SHOW AND TELL").

In many cases a user may themselves contribute to the 'set-up' of the real-world scene being captured or viewed. For example, in FIG. 1A, the business cards were positioned on the table in a relatively neat, organized, and substantially symmetrical arrangement of rows and columns in anticipation of scanning. However, in other implementations, the objects in a real-world scene can be positioned more haphazardly, without any real pattern, and/or are presented in an irregular arrangement relative to one another. This can be understood to be the case in FIG. 4, where the objects are tacked or taped to the bulletin board 404 at varying angles, orientations, and positions relative to one another. In addition, each object has a different surface area or interior size, and a different overall shape (e.g., parallelogram, trapezoid, rectangle, square, or other irregular quadrangle) or boundary (e.g., perimeter or outline). Although shown in a black and white drawing here, the objects may also be different colors. In some implementations, the systems described herein can be configured to detect candidate regions regardless of the manner of object arrangement. Thus, the application can receive images containing such arbitrary or unsystematic arrangements and proceed with an automatic candidate region detection process, as will be described below.

In different implementations, the proposed systems can include provisions for identifying portions of an image and separating foreground objects (e.g., salient items) from the background. In some implementations, an initial step in detecting the multiple candidate regions in an image is clustering, where the image data is grouped into classes or clusters so that objects within a cluster have high similarity between them, but are very different from objects in other clusters. In such a scenario, an image can be regarded as a spatial dataset, and the process of image segmentation is used to begin to partition the image into a collection of connected set of pixels. In one implementation, image segmentation can result in the delineation of non-overlapping and homogeneous groups within the image, based on varying intensity and texture values of the image. The segmentation algorithm can employ a pre-processing method in some implementations that involves de-noising the given image to pass through an appropriate filter such as median filter.

Substantially real-time segmentation of foreground from background layers in images may be provided by a segmentation process which may be based on one or more factors including motion, color, contrast, and the like. To reduce segmentation errors, color, motion, and optionally contrast information may be probabilistically fused to infer foreground and/or background layers accurately and efficiently.

Many different algorithms exist to perform background-foreground segmentation, most of which rely on color data of the pixels in the image. These methods typically operate on the assumption that pixels near each other with the same or similar color are part of the same object in the image, and this is usually determined by analyzing the color distributions or gradients in certain patterns of the pixels. Other conventional background foreground segmentation systems use depth data provided by a camera to take advantage of the smaller resolution of the depth image versus the color data. Specifically, many image capture devices also have 3D or depth sensing cameras (such as RGBD cameras) that can form a 3D space of a scene. This can be accomplished by using a stereoscopic system with an array of cameras or sensors on a single device, such as a smartphone or tablet, and that uses triangulation algorithms to determine 3D space coordinates for points in a scene to form a depth map or depth image for the scene. Other methods to generate segmented images also are known, including but not limited to chroma key segmentation (chroma keying), background subtraction, K-Means clustering, Density-Based Spatial Clustering of Applications with Noise (DBSCAN), Mean-Shift, Agglomerative Hierarchical Clustering, Expectation-Maximization (EM) Clustering using Gaussian Mixture Models (GMM), or other image segmentation methods.

Figure 5A:
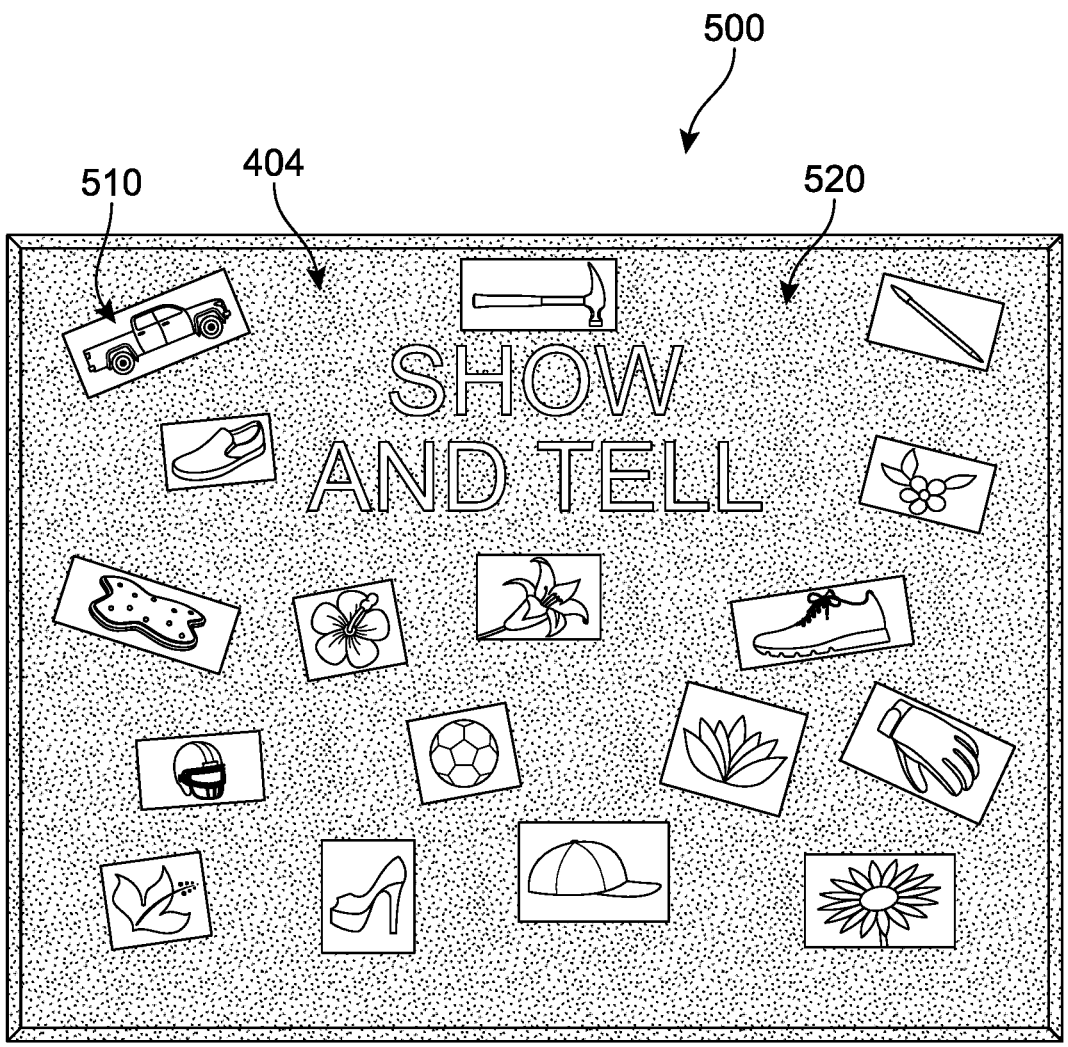
FIG. 5A is an example of an image segmentation process for an implementation of a region detection process.

One example of this process is represented schematically in FIG. 5A. The bulletin board 404 and its associated objects shown in FIG. 4 are now presented in what may be understood to comprise a segmented view 500. The scene has been partitioned into a set of regions, ideally representing the more meaningful areas of the image, such as the foreground objects, rather than the background. In some implementations, the regions might be sets of border pixels grouped into such structures as line segments and circular arc segments in images of 3D industrial objects. Segmented regions may also refer to groups of pixels having both a border and a particular shape such as a circle or ellipse or polygon. When a user initiates the multi-region mode for example, more salient foreground regions 510 may be distinguished from background regions 520. It can be understood that the algorithm used by the system will produce a set of image regions that can be conveyed and/or stored for use in the next processing step. The segmented data can be represented as overlays on the original images, labeled images, boundary encodings, quad-tree data structures, property tables, or other such annotated image data. In this example, the contours or borders of the clusters are shown, which will be used as a reference for subsequent edge detection processes. For purposes of reference, it can be seen in FIG. 5A that a set of 28 clusters have been identified. This set includes clusters corresponding to each of the 17 objects of the second scene 400 in FIG. 4, as well as a cluster corresponding to each letter object in the lettering 450.

In some implementations, the systems described herein include or otherwise make use of an edge detector operable to detect edges based upon visual differences, such as sharp changes in brightness. When edges have been identified, the edges may be joined into connected lines to form a perimeter that has a quadrangular shape. For example, vertices (corners) can be identified through an edge detection mechanism, and these vertices can be connected or mapped to form quadrangles. As a result, a set of potential quadrangular regions can be derived based on the detected edges and lines, where the lines are detected from similarly-oriented edges along a particular direction and are then combined to form the quadrangles. In some implementations, the edge detector can be directed primarily or wholly to the foreground clusters identified in a previous step, rather than the whole image, thereby significantly decreasing the amount of processing power needed to evaluate the image as well as lessen the region detection time.

Figure 5B:
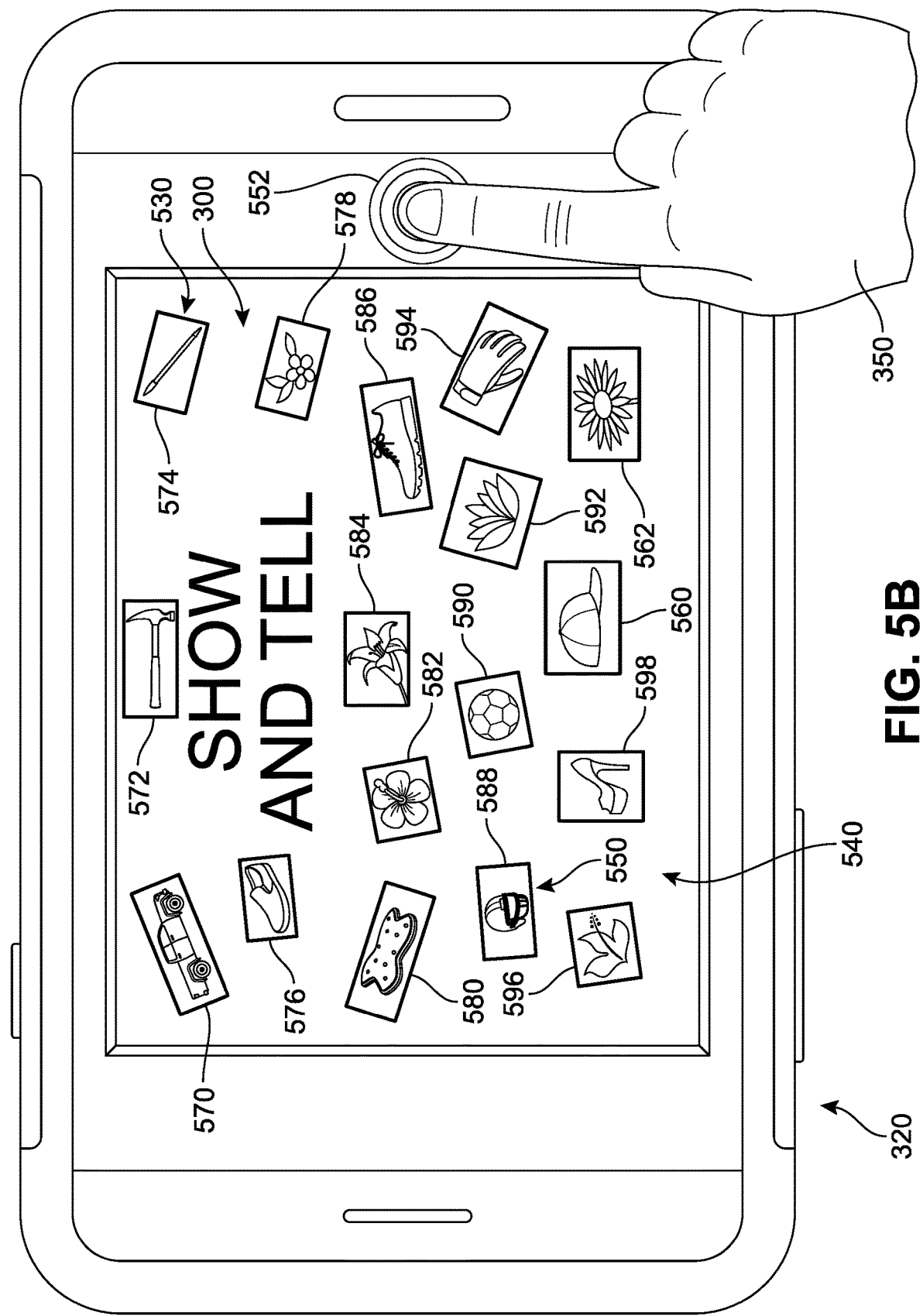
FIG. 5B is a display diagram illustrating an implementation of a user interface for an application configured to provide scanning tools with a plurality of regions in an image selected.

An example of this mechanism is presented in FIG. 5B, where a second image preview ("second image") 530, representing the portion of the second scene 400 being received by the camera of second device 320, is presented on a display 540. In different implementations, once the scan or multiple region detection feature of application 300 has been activated or initiated, the application 300 can be configured to automatically detect regions for scanning in the image. However, it should be understood that in other implementations, the application may not require any transition between a passive mode and an active mode and may instead be configured to detect regions for scanning as soon as an image viewing is initiated.

In FIG. 5B, the second image 530 also includes a plurality of visual indicators ("indicators") 550. In this case, each indicator is associated with or surrounding a perimeter of the detected regions. The indicators 550 can indicate to a user that a candidate region has been detected, and/or emphasize the region's boundaries. Such indicators may appear in the user interface to help distinguish or highlight quadrangles that are detected and/or have been selected within a captured image. The indicator can vary in different implementations, and can include various effects, such as blinking, changes in luminosity, superimposition of graphical elements along portions of the detected region, flashing, animated lines, color changes, flags, graphical elements such as points or circles at each vertex and dashed or solid lines appearing along edges, or other such visual indicators. For example, in FIG. 5B the indicators 550 includes an increased brightness that substantially surrounds seventeen detected quadrangular candidate regions. It can be noted that the 11 letters, though identified as potentially salient objects by the previous clustering algorithm, are not associated with any visual indicators, having been determined by the edge detector as being highly irregular and/or non-quadrangular.

Thus, in FIG. 5B each of the seventeen clusters have been reviewed by the edge detector and demarcated as specific regions that will comprise the targets of scanning by a distinct and separate visual indicator. More specifically, with reference to both FIGS. 4 and 5B, a first region 570 corresponds to the first object 410 of the bulletin board 404, a second region 572 corresponds to the second object 412, a third region 574 corresponds to the third object 414, a fourth region 576 corresponds to the fourth object 416, a fifth region 578 corresponds to the fifth object 418, a sixth region 580 corresponds to the sixth object 420, a seventh region 582 corresponds to the seventh object 422, an eighth region 584 corresponds to the eighth object 424, a ninth region 586 corresponds to the ninth object 426, a tenth region 588 corresponds to the tenth object 428, an eleventh region 590 corresponds to the eleventh object 430, a twelfth region 592 corresponds to the twelfth object 432, a thirteenth region 594 corresponds to the twelfth object 434, a fourteenth region 596 corresponds to the fourteenth object 436, a fifteenth region 598 corresponds to the fifteenth object 438, a sixteenth region 560 corresponds to the fifteenth object 440, and a seventeenth region 562 corresponds to the seventeenth object 442.

The user can view the indicators 550 and preview which regions are expected to be captured during the scanning operation. If the user accepts the displayed array of candidate regions, he or she may submit a user input (here shown as a finger tap to a button 552) to activate the scanning operation. Such an input can trigger an automatic capture of each of the individual regions detected by the system. In other implementations, no further user input may be necessary in order to trigger image capture.

Figure 6A:
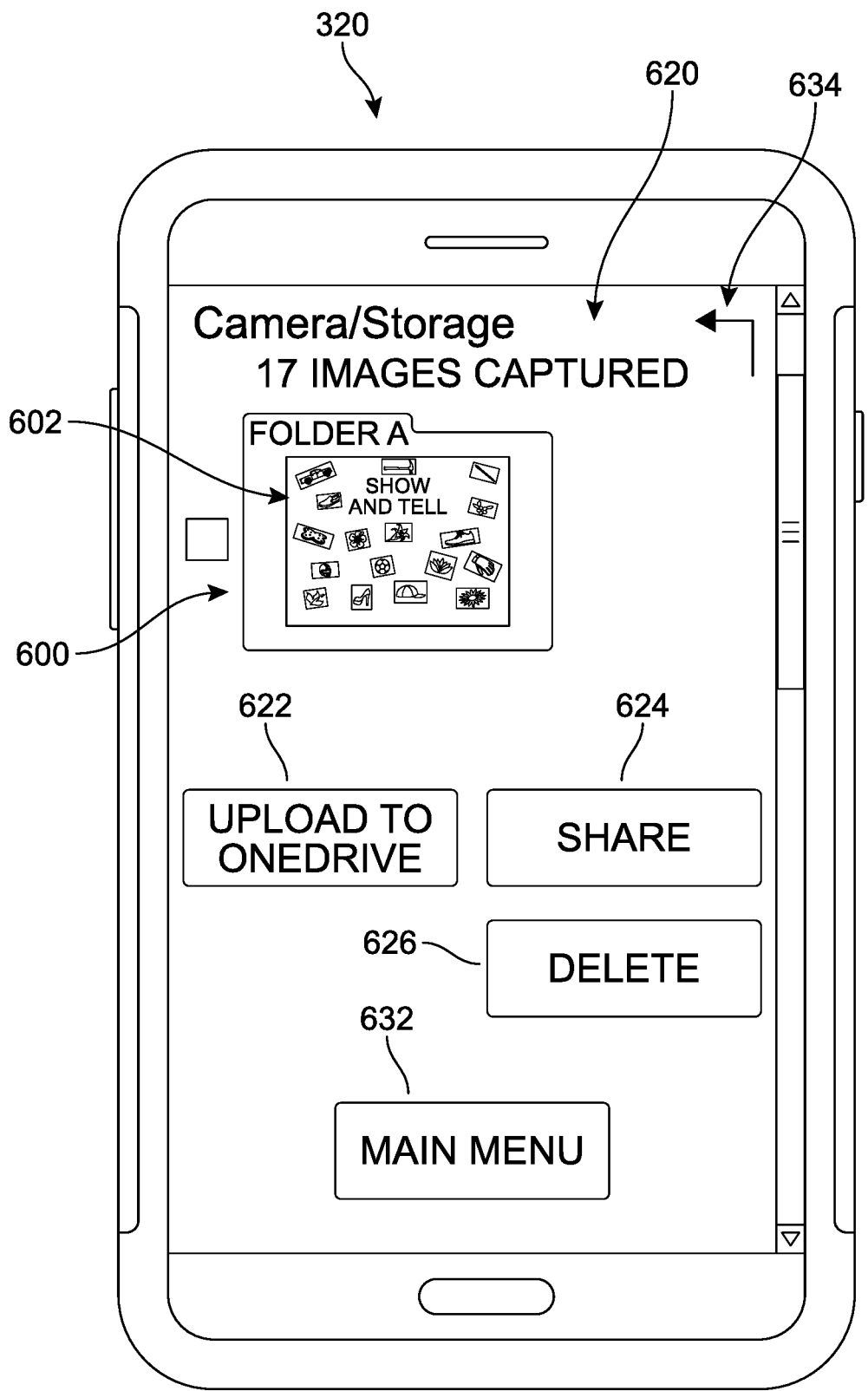
FIGS. 6A and 6B are display diagrams illustrating an implementation of a user interface for an application configured to provide scanning tools where the plurality of regions in FIG. 5B have been captured and stored in a folder.

In different implementations, the system can include provisions for storing the images captured by the camera in a way that facilitates the user's experience of the multi-region detection system. In FIG. 6A, the scan operation initiated in FIG. 5B has been completed. The discrete image content for each of the candidate regions, once captured, can be saved as a set of image files. For example, in FIG. 6A, a first folder 600 (labeled "FolderA" for illustration), stored under a '/storage/Camera' heading 610, is accessed via a scanned images access interface 620. For ease of reference, an icon 602 depicting the second image as a whole is displayed in conjunction with the first folder 600. In some implementations, the scanned images access interface 620 can present one or more selectable or actionable options for further engaging with the image content. Some examples are shown, including an Upload option 622, by which a user may upload (or back-up) to a cloud or other storage some or all 17 image files of the first folder 600, a Share option 624 for easily sharing (e.g., emailing, texting, social media posting, etc.) some or the images in the first folder 600, as well as a Delete option 626 for removing or erasing one or more of the 17 discrete image content files of the first folder 600. Some implementations can also include an option to return to the main menu (main menu option 632), or to navigate to the last viewed content ('back' option 634), as well as other navigation or editing options.

Figure 6B:
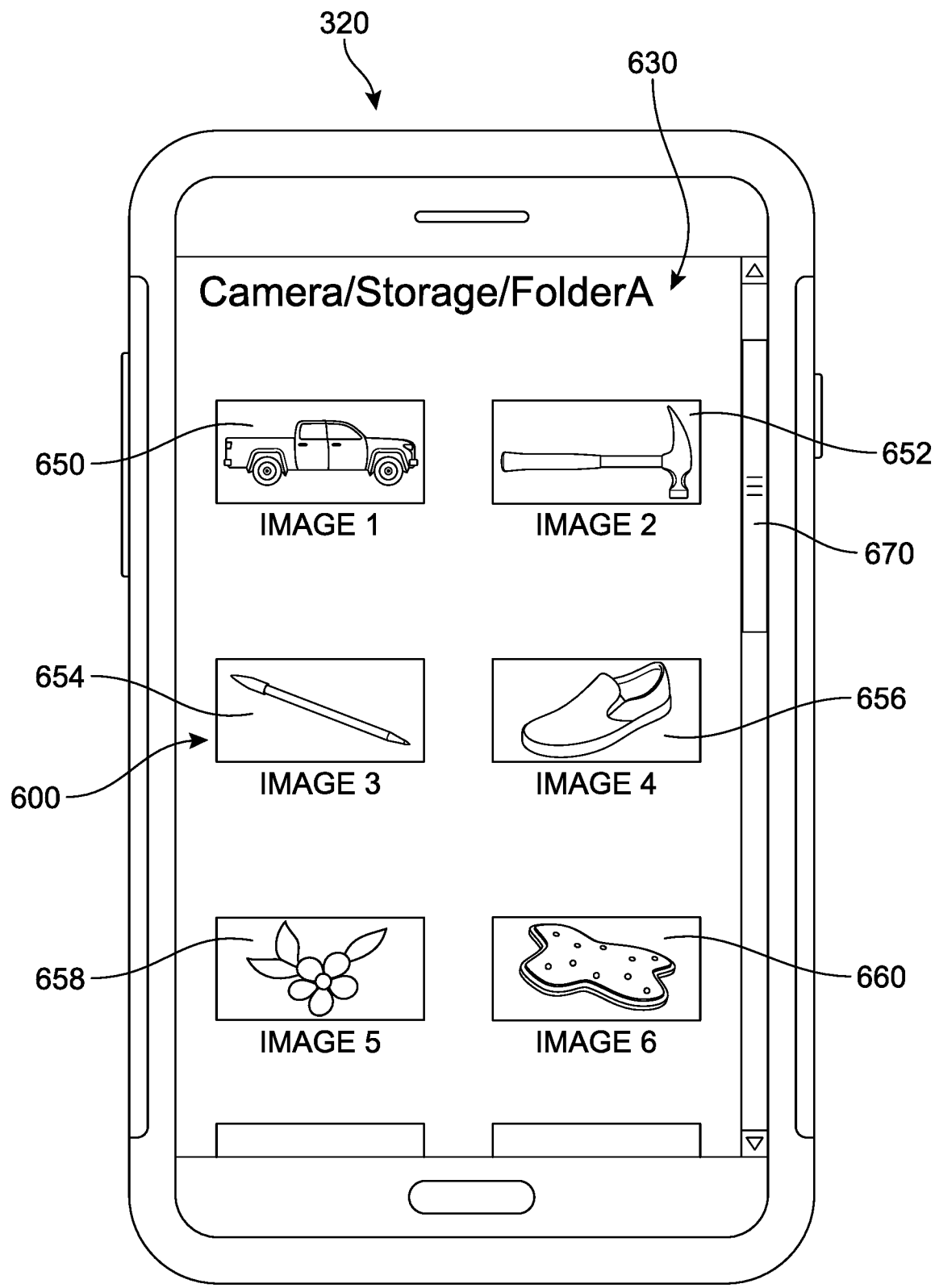

In addition, a user can select the folder itself, or an option associated with the folder, to open a scanned images viewing interface 630, as shown in FIG. 6B, in this example, the first folder 600, once opened, is revealed as including a plurality of scanned images. Each image corresponds to a discrete image content that was contained or associated with one detected region. While only six scanned images are displayed in FIG. 6B, a scroll bar 670, 'next page', or other such mechanism can be provided to navigate through the entirety of first folder 600. In this case, referring to both FIGS. 5B and 6B, a first scanned image 650 corresponds to the first region 570, a second scanned image 652 corresponds to the second region 572, a third scanned image 654 corresponds to the third region 574, a fourth scanned image 656 corresponds to the fourth region 576, a fifth scanned image 658 corresponds to the fifth region 578, a sixth scanned image 660 corresponds to the sixth region 580, and so forth.

It may be appreciated that in many cases, the plurality of candidate regions initially detected and presented by the system may not correspond to the specific set of regions desired for scanning by the user. In different implementations, a user can provide an input signal that can be used by the application 300 to refine or improve the region detection process. This signal can vary, but can include a user input that designates or identifies one or more of the candidate regions to either discard or remove from the scanning operation, or to confirm or re-select that region. Some examples of these mechanisms will now be presented with reference to FIGS. 7A-9B.

Figure 7A:
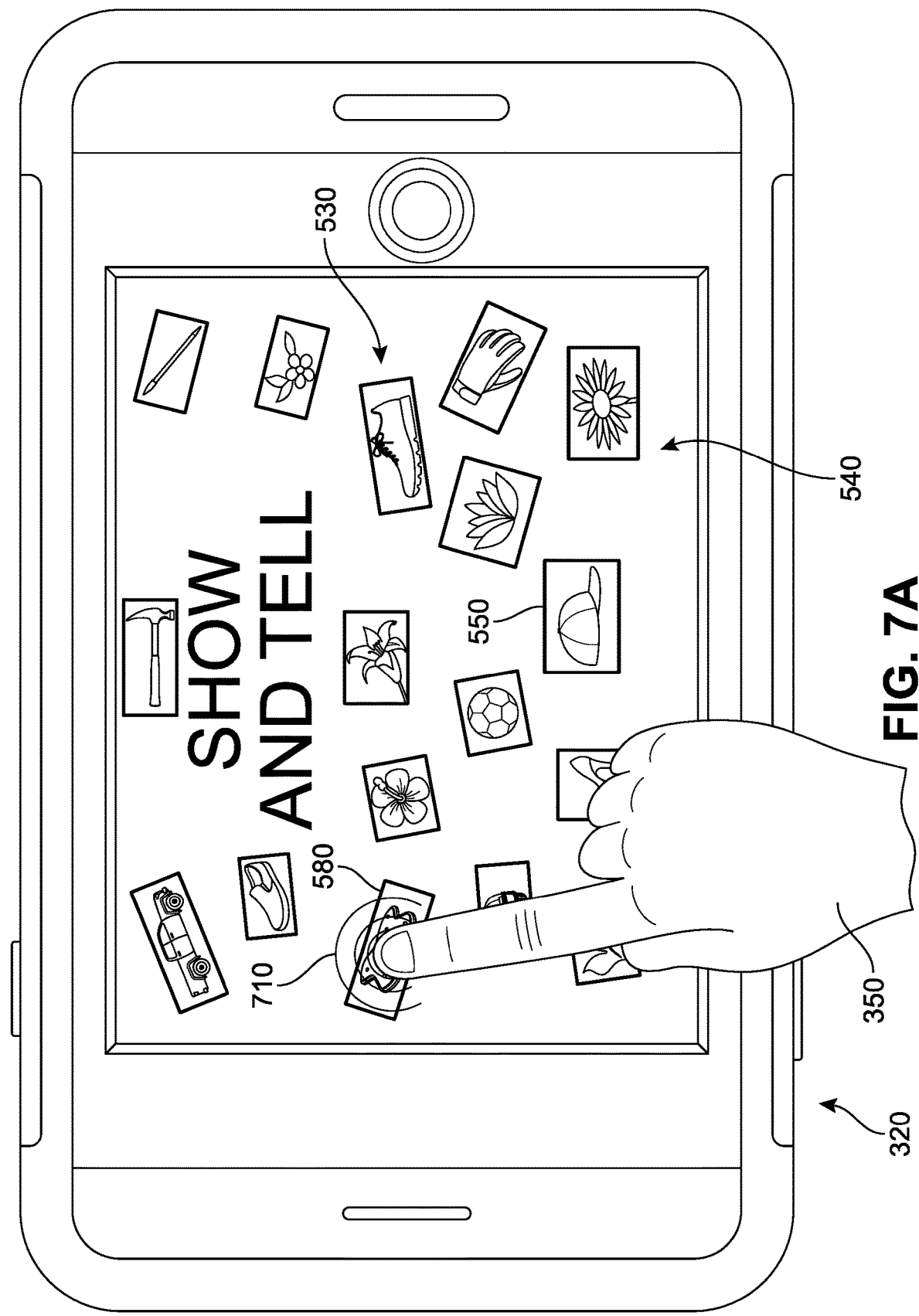
FIGS. 7A and 7B are display diagrams illustrating an implementation of a user interface for an application configured to provide scanning tools where a first user input and a second user input causes two regions to be deselected for scanning.
Figure 7B:
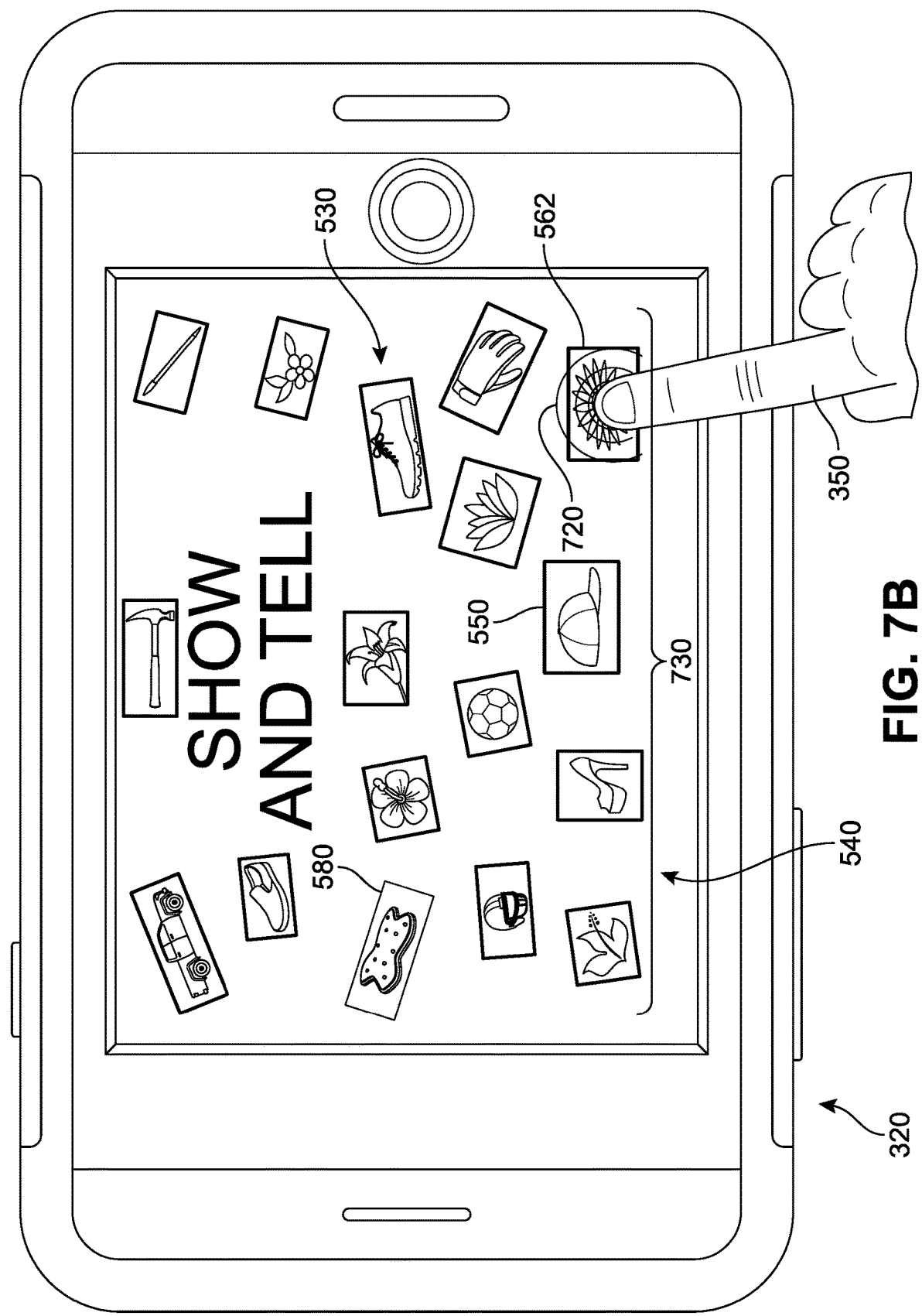

In FIG. 7A, the second image 530 is again shown on the display 540 of second device 320, along with the indicators 550. As noted earlier, each of the 17 regions presented with the aid of these indicators 550 can be understood comprise the automatically detected potential targets of scanning. The user can view the indicators 550 and thereby preview which regions are expected to be captured during the scanning operation. If the user does not accept the displayed array of regions, he or she may submit a user input to deselect one or more of the detected regions. In this example, the user 350 provides a first input 710 to some of the pixels associated with the sixth region 580. In response, as illustrated in FIG. 7B, the sixth region 580 no longer includes an indicator. In other words, though the system initially detected and presented a set of 17 candidate regions, in response to the user input, the application has registered a deselection, and only 16 regions remain in a first scanning set 730.

Figure 8:
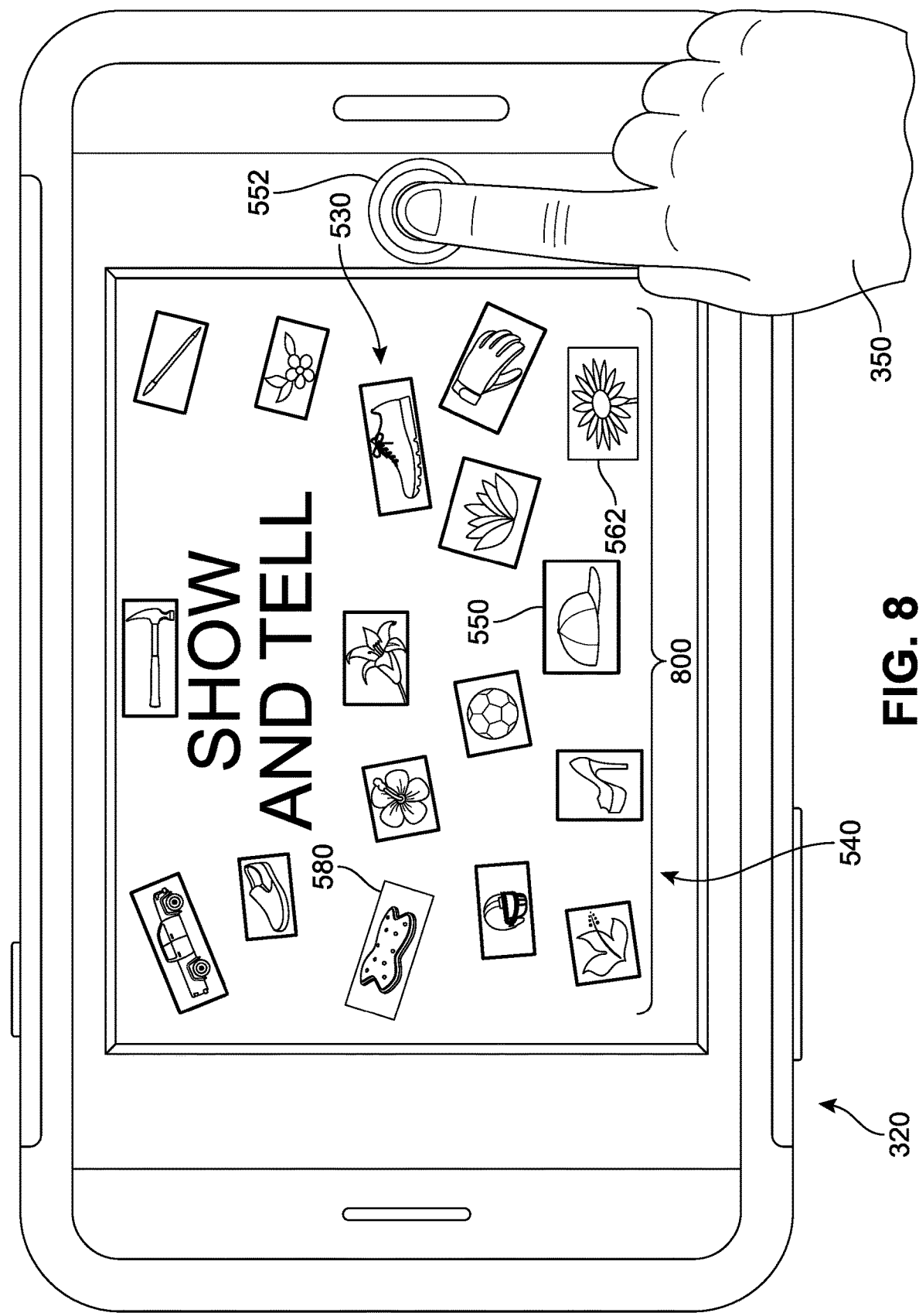
FIG. 8 is a display diagram illustrating an implementation of a user interface for an application configured to provide scanning tools for those regions that remain selected.

Furthermore, in FIG. 7B, the user 350 again opts to deselect a detected region—here, seventeenth region 562—via a second input 720. Turning to FIG. 8, the updated, second scanning set 800 now includes 15 regions. In other words, following the two user inputs, two regions previously presented as candidates for scanning from the second image 530 have been pulled from the set. Thus, when the scan is initiated (as represented by a finger tap to button 552) each of the individual regions detected by the system, minus the two deselected regions, will be captured. In other implementations, no farther user input may be necessary in order to trigger image capture of the remaining regions.

It should be understood that while in this example the visual indicators associated with the sixth region 580 and the seventeenth region 562 were simply removed, in other implementations, the visual indicator can instead be modified. For example, the brightness of the indicator can be decreased, the degree of translucence increased, the thickness of the boundary outline reduced, and/or the color of the indicator changed relative to the remaining (selected) candidate regions, etc., in order to distinguish the deselected regions while also continuing to identify these regions as potentially scannable.

A similar mechanism is shown in reference to FIGS. 9A and 9B. In FIG. 9A, the second image 530 is again shown on the display 540 of second device 320, along with visual indicators 550. As noted earlier, each of the 17 regions presented with the aid of these indicators 550 can be understood comprise the auto-detected potential targets of scanning in the image. In some implementations, the indicators 550 may, rather than identify the sectors that will be scanned, instead be provided to offer suggestions or guidance to a user as to which regions were detected and are available for acquisition by scanning. In other words, though the system initially detected and presented a set of 17 candidate regions, unless the user provides some additional input(s) particularly selecting the regions that are desired, the application will not proceed with the scanning operation.

In such cases, a user may confirm which of the identified regions they specifically desire should be captured during the scanning operation. If the user wishes to scan any of the regions, he or she may submit a user input to select one or more of the detected regions. In this example, the user 350 provides a third input 910 to some of the pixels associated with the sixth region 580. In response, as illustrated in FIG. 9B, the sixth region 580 now includes a first indicator 930 that is larger or brighter or otherwise distinct relative to the remaining indicators for the unselected regions.

Furthermore, in FIG. 9B, the user 350 again opts to select a detected region—here, seventeenth region 562—via a fourth input 920. If a user now initiates the scanning operation, only the image content for two regions (sixth region 580 and seventeenth region 562) will be captured and stored in the first folder. While in this example the visual indicators associated with the sixth region 580 and the seventeenth region 562 were simply modified, in other implementations, the visual indicator can instead be enhanced with a check mark or some other confirmatory symbol. In one implementation, the selected regions may be associated with a green indicator, while the unselected regions remain red (as one example). In other implementations, other visual cues can be shown.

Figure 10:
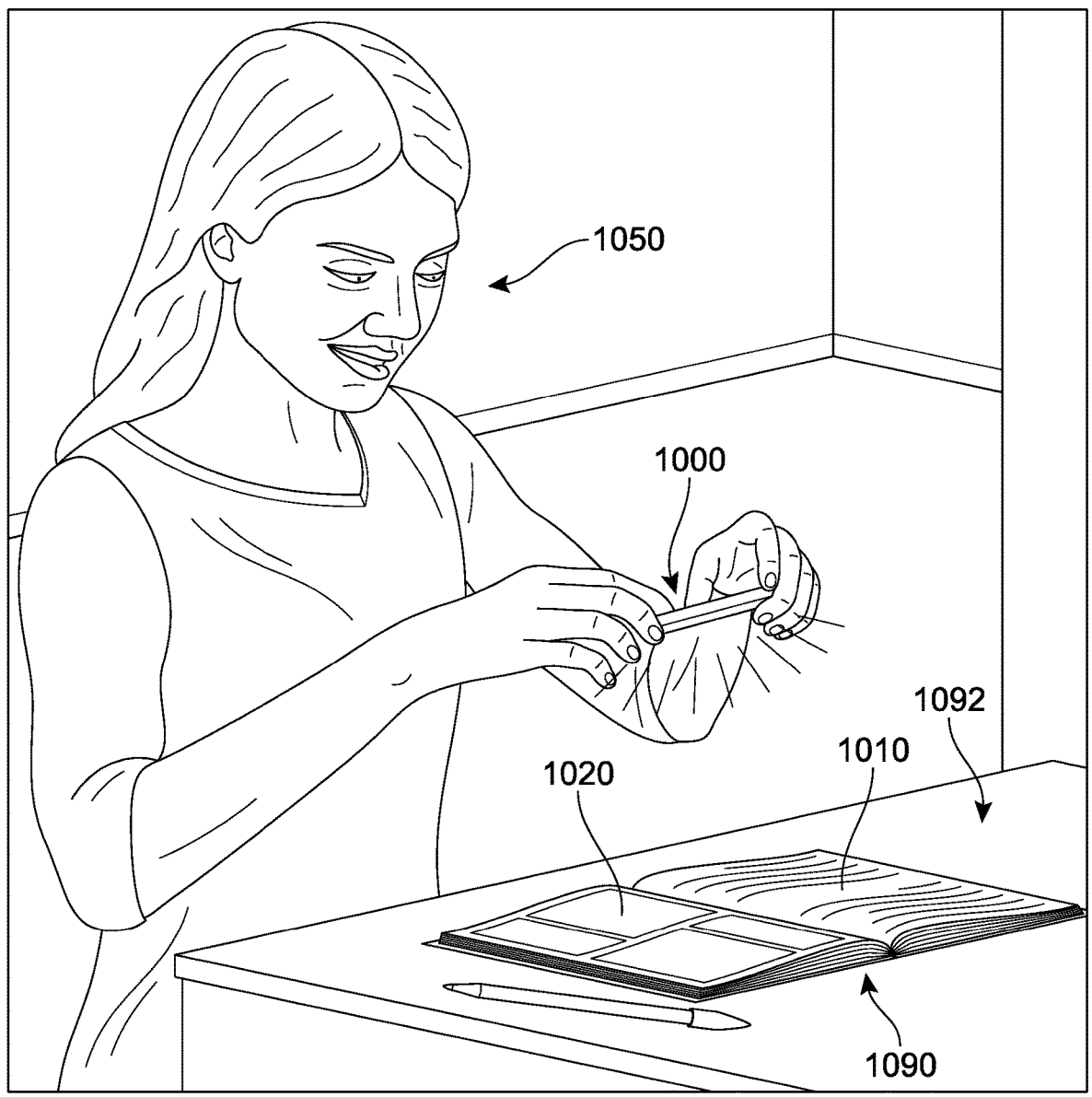
FIG. 10 is an example of a user receiving an image for scanning for a computing device.

For purposes of clarity, another example of the multi-region detection scanning system is illustrated in the sequence of FIGS. 10-12B. In FIG. 10, a third user 1050 is shown positioning a third computing device ("third device") 1000 such that the device's camera optical lens is directed toward a book 1090 lying on the surface of a table 1092. The opened book 1090 has two pages (a left-hand page 1010 and a right-hand page 1020) that are visible to the user 1050. As the third user 1050 looks down with the third device 1000, several images and sections of text may be perceived. In some implementations, an image capture software application associated with the third device 1000 may automatically initiate an image processing paradigm that includes implementation of image segmentation and edge detection algorithms as the image is received (i.e., in live preview mode). However, in other implementations the third user 1050 may choose to capture the image as a whole at this time (as illustrated by the dashed action lines emanating from the third device 1000), and save this image for scanning at a subsequent time.

Figure 11:
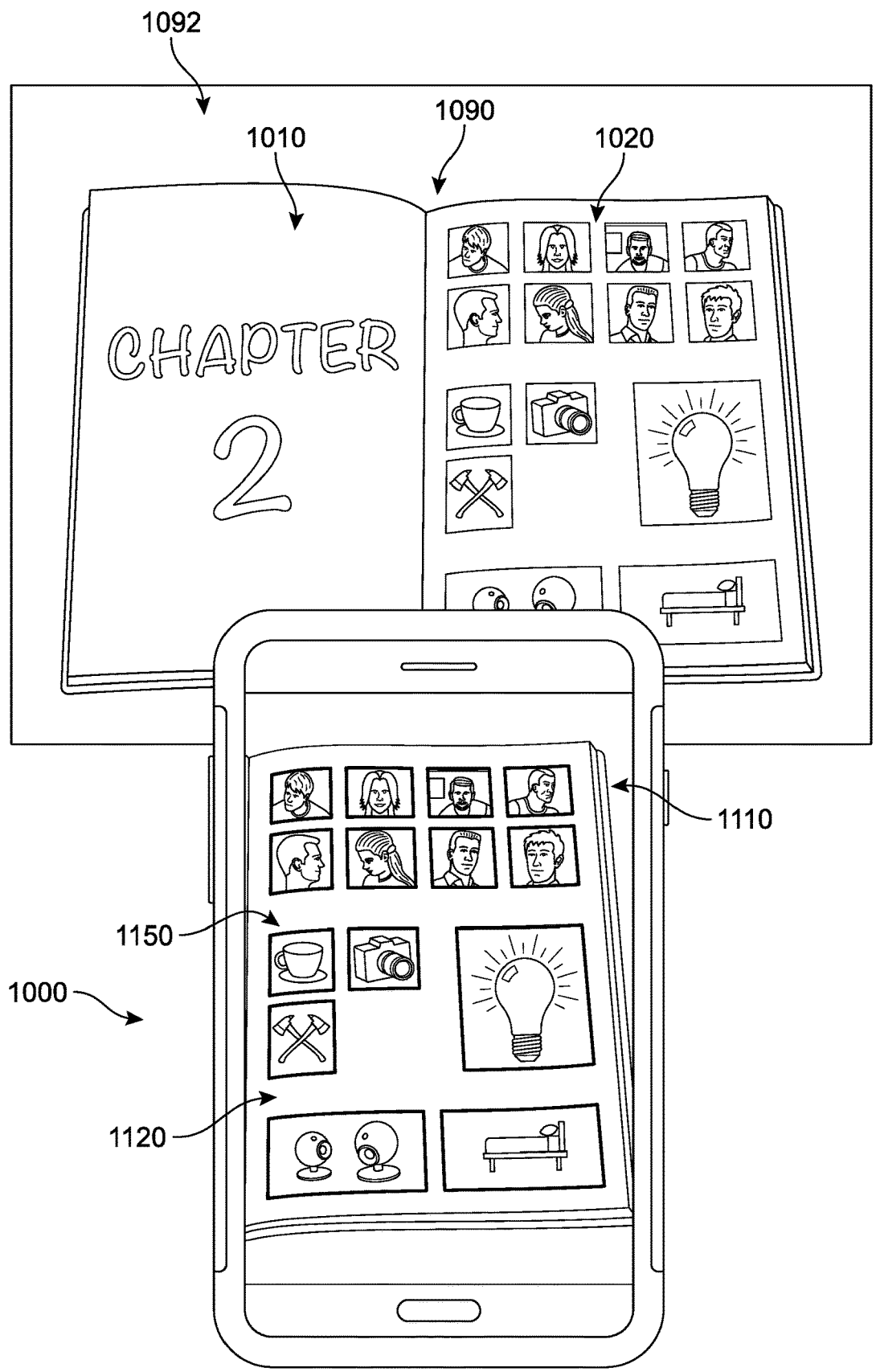
FIG. 11 is an example of a real-world scene being captured by an application configured to detect a plurality of regions in the image.

This subsequent scanning operation is shown in FIG. 11, where a display 1110 of the third device 1000 presents a saved image 1120 of the right-hand page 1020. The saved image 1120, being opened or accessed by an implementation of a scanning application at any subsequent time, can be the subject of a multiple-region scan detection as described earlier. The static image is processed and subjected to image segmentation and edge detection processes. In FIG. 11, a plurality of target regions 1150 are identified in the saved image 1120. Each target region is also associated with a visual indicator. In response to a user input triggering the scanning process (or following a delay of a pre-set period of time) the image content for each region detected (in this example, 14 regions) will be captured as a discrete set of data.

Figure 12A:
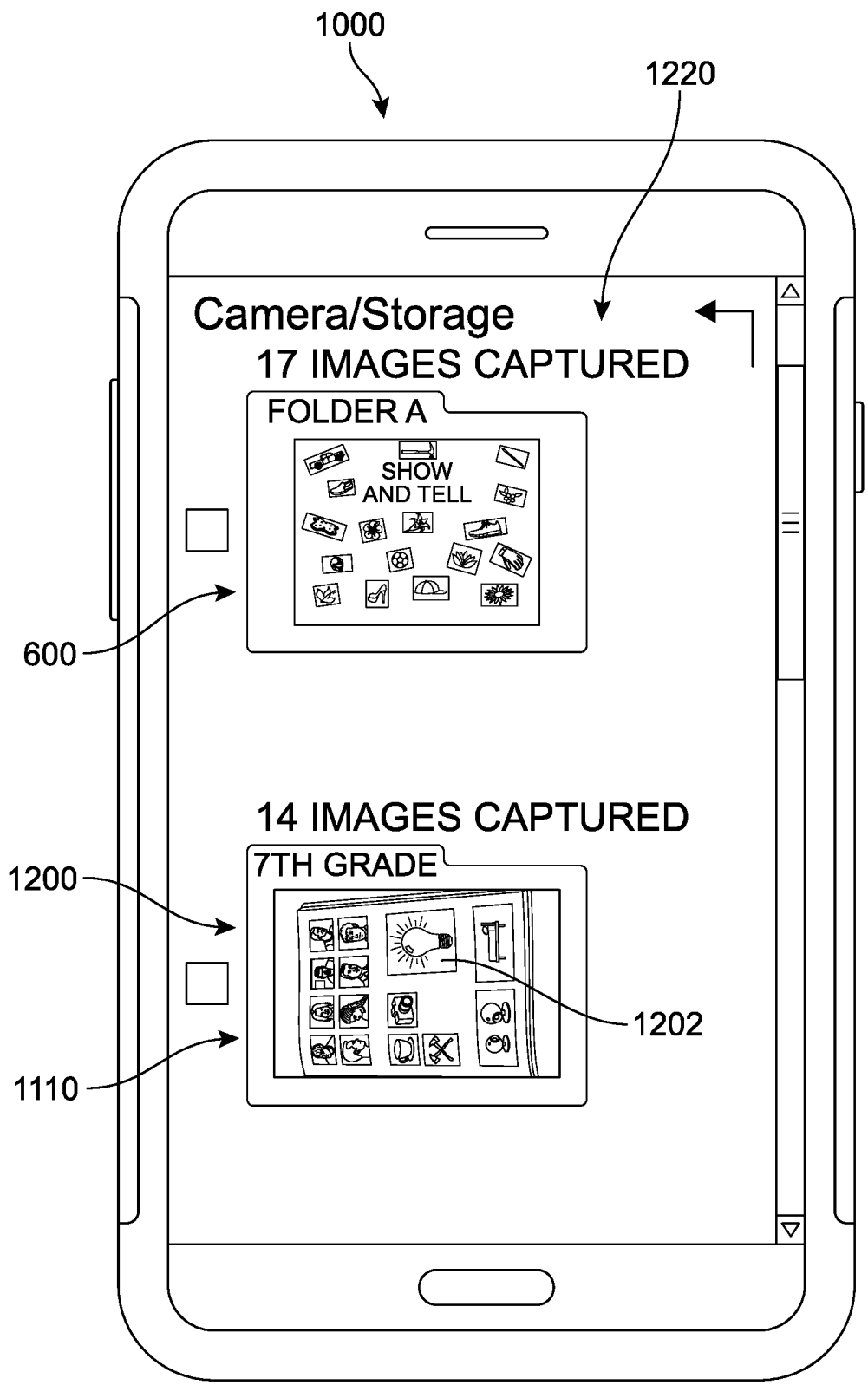
FIGS. 12A and 12B are display diagrams illustrating an implementation of a user interface for an application configured to provide scanning tools where the plurality of regions in FIG. 11 have been captured and stored in a folder.

Referring next to FIG. 12A, the scan operation initiated in FIG. 11 has been completed. The discrete image content for each of the candidate regions, once captured, are saved as a set of image files. In this example, the first folder 600 is also illustrated simply for purposes of comparison, followed by a second folder 1200 ("seventh grade"), where both folders stored under a '/storage/Camera' heading 1210 and accessed via a scanned images access interface 1220. For ease of reference, an icon 1202 depicting the second image as a whole is displayed in conjunction with the second folder 1200. In some implementations, the scanned images access interface 1220 can also present one or more selectable or actionable options for further engaging with the image content (see FIG. 6A).

Figure 12B:
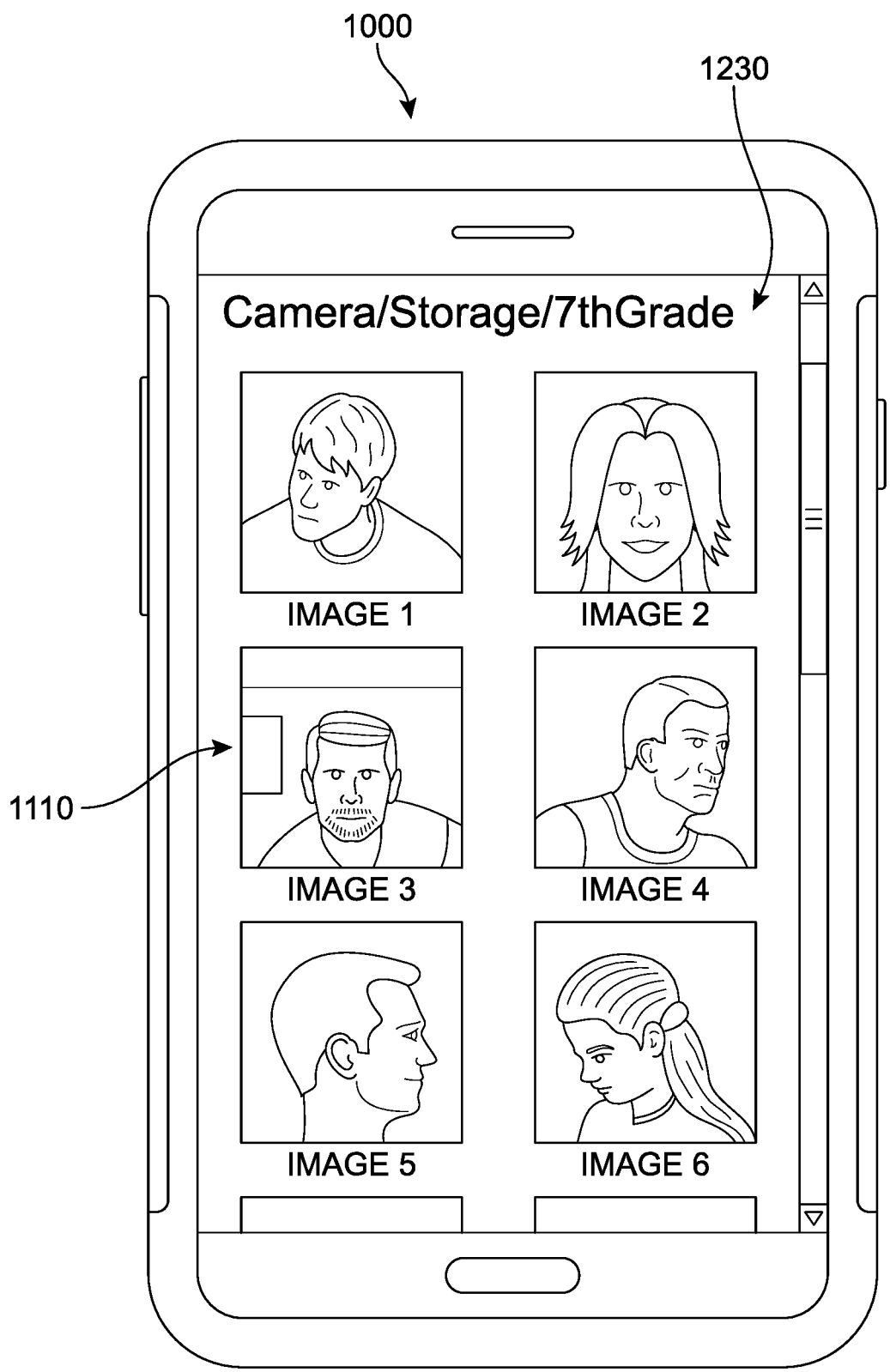

In different implementations, the user can select the folder itself or an option associated with the folder to open a scanned images viewing interface 1230, as shown in FIG. 12B. In this example, the second folder 1200, once opened, is revealed as including a plurality of scanned images. Each image corresponds to a discrete image content that was contained or associated with the detected region. While only six scanned images are displayed in FIG. 12B, a scroll bar or other such mechanism can be provided to navigate through the entirety of second folder 1200.

It should be understood that alongside the tools described herein, other scanning features can remain available to users while using the application. For example, in some implementations, the various indicators may be selectable by the user to permit adjustments to a selected quadrangle, such as by dragging of a corner to reposition the corner. As another example, a user may define a custom quadrangle by selecting one corner through interaction with the user interface and the application can in some cases automatically derive a corresponding quadrangle based upon the user selection of the specified corner. The user may also be able to apply a select and drag tool with the user interface to more directly identify an area for selection (e.g., custom quadrangles).

Figure 13:
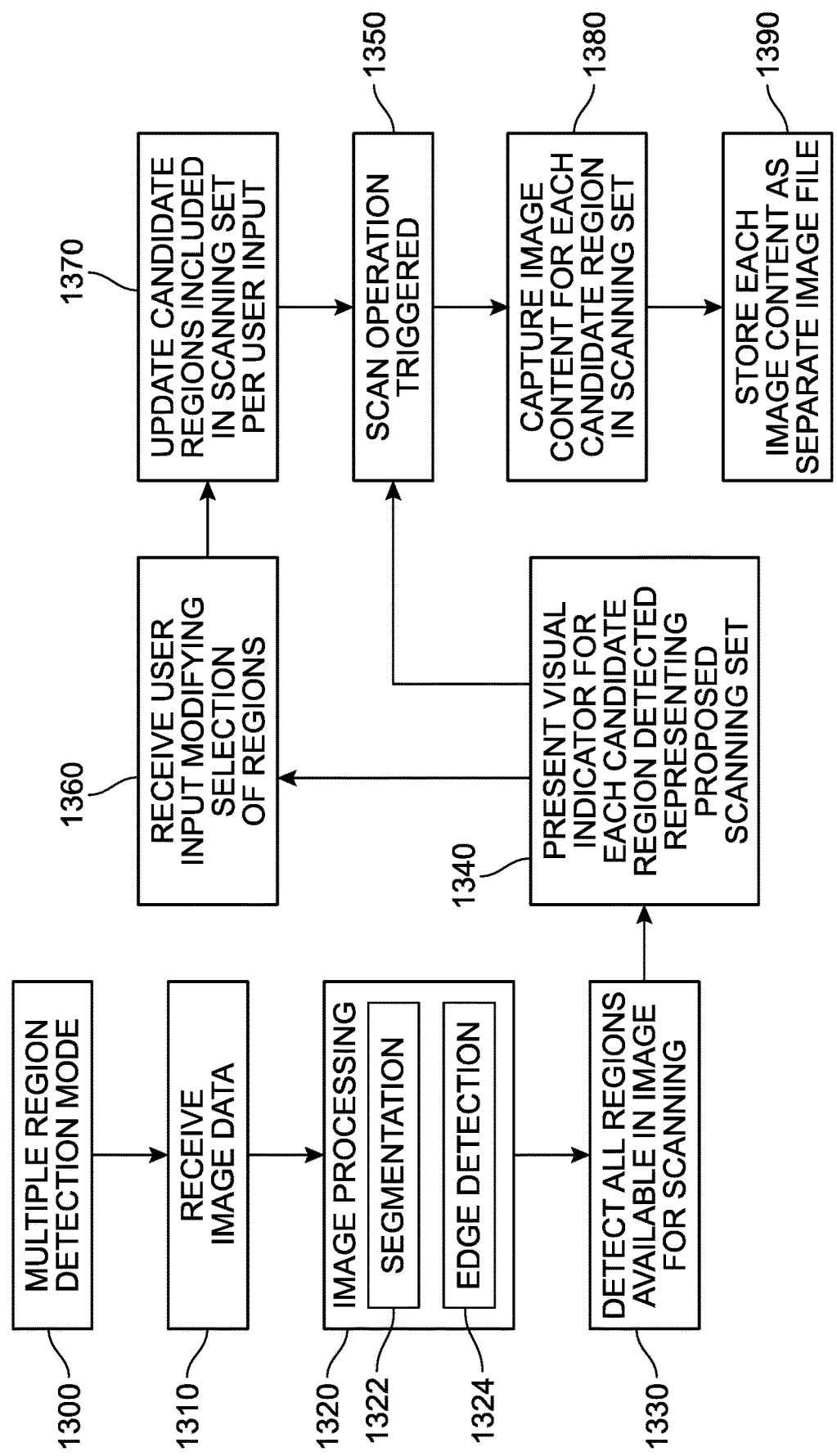
FIG. 13 is a process flow diagram of an implementation for a scanning selection tool.

For purposes of clarity, FIG. 13 illustrates one implementation of a process for automatic detection of scanning regions in a single image. In this example, a first stage 1300 includes the activation or access of the multiple region detection system or mode associated with a device. The mode will typically be accessed via a scanning application associated with a computing device. The system can then receive image data in a second stage 1310, which will be submitted for image processing 1320 in a third stage. In some implementations, segmentation processes 1322 can generate a clustered image output. Edges can then be detected 1324 with respect to this output. A plurality of regions can be detected in the processed image in a fourth stage 1330, which can initiate a presentation of the candidate regions on the device display in a fifth stage 1340, usually via the superimposition of a visual indicator in or around the region associated with the identified region. These regions can be the subject of a scanning operation in a sixth stage 1350. However, in some implementations, the user may modify the selected regions in a seventh stage 1360, which will change the set of candidate regions that will be submitted for scanning in an eighth stage 1370. Once the scanning operation is initiated (sixth stage 1350) on the full or modified scanning set, image content for each of these regions can be captured in a ninth stage 1380, and stored as a separate image file 1390. In some implementations, the files can be stored collectively in the same folder for ease of identification.

Figure 14:
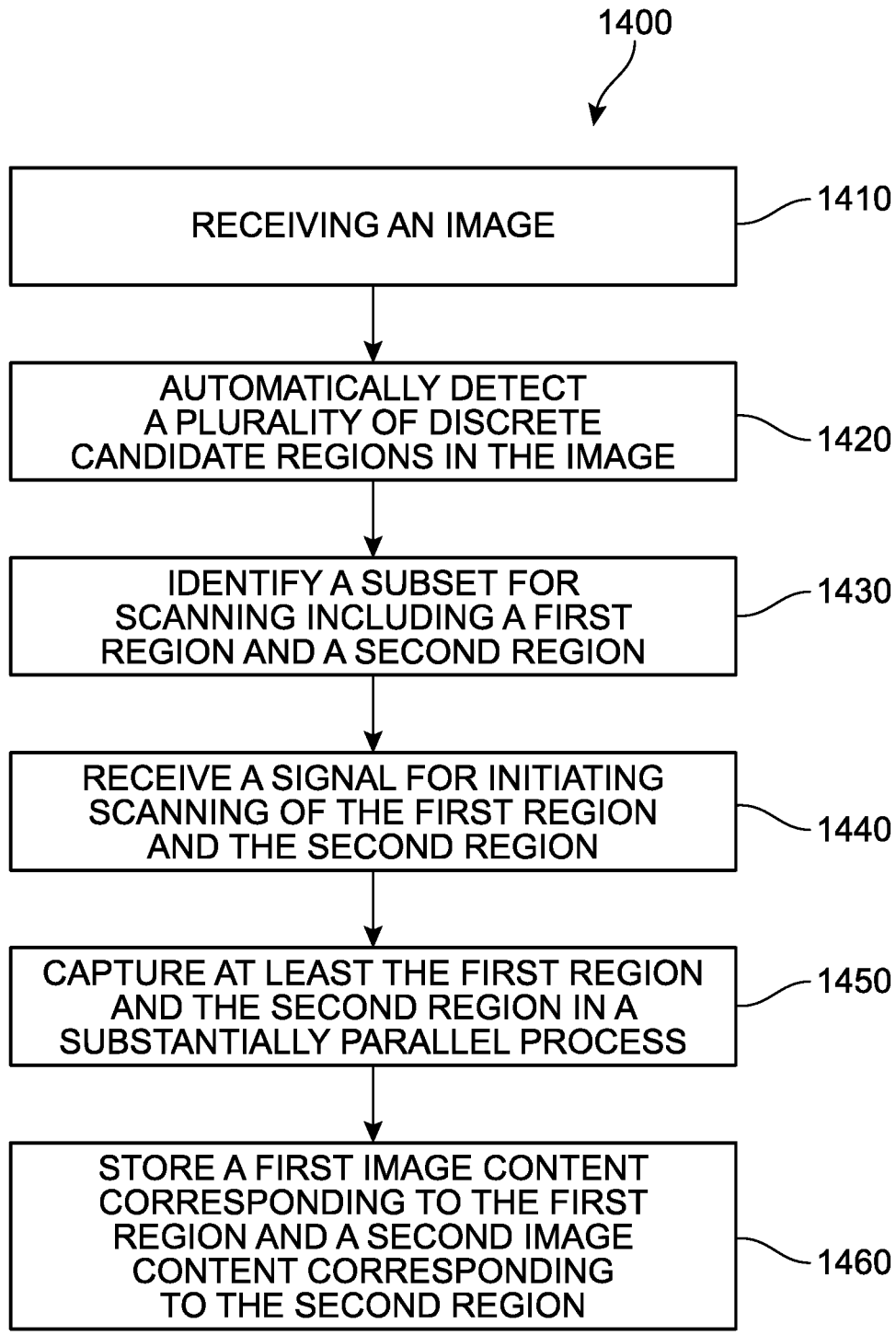
FIG. 14 is a flow diagram illustrating an implementation of a process for managing scanning selections.

FIG. 14 is a flow chart illustrating an implementation of a method 1400 of managing the detection and selection of potential scanning regions in electronic content. In FIG. 14, a first step 1410 includes receiving an image via an image scanning application, and a second step 1420 includes automatically detecting a plurality of discrete candidate regions in the image. In a third step 1430, the method includes identifying a subset of the plurality of discrete candidate regions for scanning, where the subset includes a first region and a second region. A fourth step 1440 includes receiving a signal for initiating scanning of at least the first region and the second region. The signal can comprise a user-initiated input for triggering image capture or initiating the scanning operation, or can include other events such as a detection of a pre-set passage of time, in a fifth step 1450, the method involves capturing, in response to the signal, at least the first region and the second region in a substantially parallel process. A sixth step 1460 includes storing at least a first image content corresponding to the first region and a second image content corresponding to the second region in a scanned images folder.

In other implementations, the method can include additional or alternate steps. For example, the method may further include presenting a graphical user interface for accessing of stored image content, and then presenting a first set of information for the first image content and a second set of information for the second image content on the device display, for example as files in a single folder. As another example, the method may include presenting the image on a device display, and then overlaying at least a first perimeter of the first region with a first visual indicator, as well as overlaying at least a second perimeter of the second region with a second visual indicator.

In another example, the subset of the plurality of discrete candidate regions may further include a third region. In such cases, the method can further include receiving a first user input, associated with the third region, for deselecting the third region, and then removing the third region from the subset of the plurality of discrete candidate regions. In some implementations, the method of claim also includes presenting the image on a device display as a first image preview, and distinguishing each of the plurality of discrete candidate regions in the first image preview by an overlay of a visual indicator on at least a portion of each region. In some other implementations, the method alternatively includes receiving a first input (e.g., from a user), associated with the third region, for deselecting the third region, and removing the visual indicator overlaid on the third region.

In different implementations, each region of the plurality of discrete candidate regions is substantially quadrangular in shape. In another implementation, the first region is oriented at a first orientation (for example, relative to a horizontal axis of the full image) and the second region is oriented at a second orientation (for example, relative to the same horizontal axis of the full image), and the first orientation differs from the second orientation. In one example, a first area of the first region is larger than a second area of the second region.

In some implementations, the method can also include partitioning the image into a plurality of segments via a clustering algorithm to produce a segmented image, and applying an edge detection algorithm to the segmented image. In such cases, the automatic detection of the plurality of discrete candidate regions in the image is based at least on the application of the edge detection algorithm to the segmented image. In some other implementations, the subset of the plurality of discrete candidate regions may further include a third region, and the method can then also include receiving a first input, associated with the first region, for selecting the first region, receiving a second input, associated with the second region, for selecting the second region, and then removing, in response to the signal, the third region from the subset of the plurality of discrete candidate regions (prior to initiating the scanning operation).

As another example, in cases where the subset of the plurality of discrete candidate regions further includes a third region, the method can also include capturing, in response to the first signal, the third region during the substantially parallel process, and then storing a third image content corresponding to the third region in the scanned images folder. In one implementation, the method can involve automatically adjusting, in response to a user input, a size of the first perimeter of a selected region.

The use of the disclosed systems and methods can enable users to easily view an image and view a plurality of regions available for scanning in the image. The ability to preview all of the potential candidate regions, both in real-time image capture and in stored images, offers a wide range of benefits to users. This feature substantially reduces the time needed to scan various items; rather than attempting to re-capture the same image to obtain a new quadrangular region for scanning, a user may simply direct the application to the image and the application can then automatically detect region(s) that can be acquired as discrete image files. Furthermore, by offering users a simple means by which to select multiple, discrete regions for scanning within a single image, users can enjoy a selectivity in their resultant scans.

For the sake of simplicity of description, details are not provided herein for performing various image processing steps. Implementations of the present disclosure can make use of any of the features, systems, components, devices, and methods described in U.S. Patent Publication Number 2011/0069180 to Nijemcevic et al., published Mar. 24, 2011 and entitled "Camera Based Scanning," as well as its disclosed methods and systems for the processing of images with regard to color, intensity, resolution, image effects and so forth, the disclosure of which is herein incorporated by reference in its entirety. Furthermore, implementations of the present disclosure can make use of any of the features, systems, components, devices, and methods described in U.S. Pat. No. 9,516,227 to Chau, et al., issued on Dec. 6, 2016 and entitled "Camera non-touch switch"; U.S. Pat. No. 6,965,645 to Zhang et al., issued on Nov. 15, 2005 and entitled "Content-based characterization of video frame sequences"; U.S. Pat. No. 7,408,986 to Winder, issued on Aug. 5, 2008 and entitled "Increasing motion smoothness using frame interpolation with motion analysis"; U.S. Patent Publication Number 2017/0140250 to Maloney et al., published on May 18, 2017 and entitled "Content file image analysis"; U.S. Pat. No. 9,596,398 to Khawand, issued on Mar. 14, 2017 and entitled "Automatic image capture"; U.S. Patent Publication Number 2014/0307056 to Roma et al., published on Oct. 16, 2014 and entitled "Multimodal Foreground Background Segmentation"; U.S. Patent Publication Number 2011/0293180 to Criminisi et al., published on Dec. 1, 2011 and entitled "Foreground and Background Image Segmentation"; U.S. Pat. No. 7,720,282 to Blake et al., issued May 18, 2010 and entitled "Stereo Image Segmentation"; U.S. Pat. No. 7,676,081 to Blake et al., issued on Mar. 9, 2010 and entitled "Image segmentation of foreground from background layers"; and U.S. patent application Ser. No. 16/127,209 to Agarwal, filed on Sep. 10, 2018 and entitled "Multi-Region Detection For Images" the disclosures of each of which are herein incorporated by reference in their entirety.

The detailed examples of systems, devices, and techniques described in connection with FIGS. 1-14 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-14 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 15:
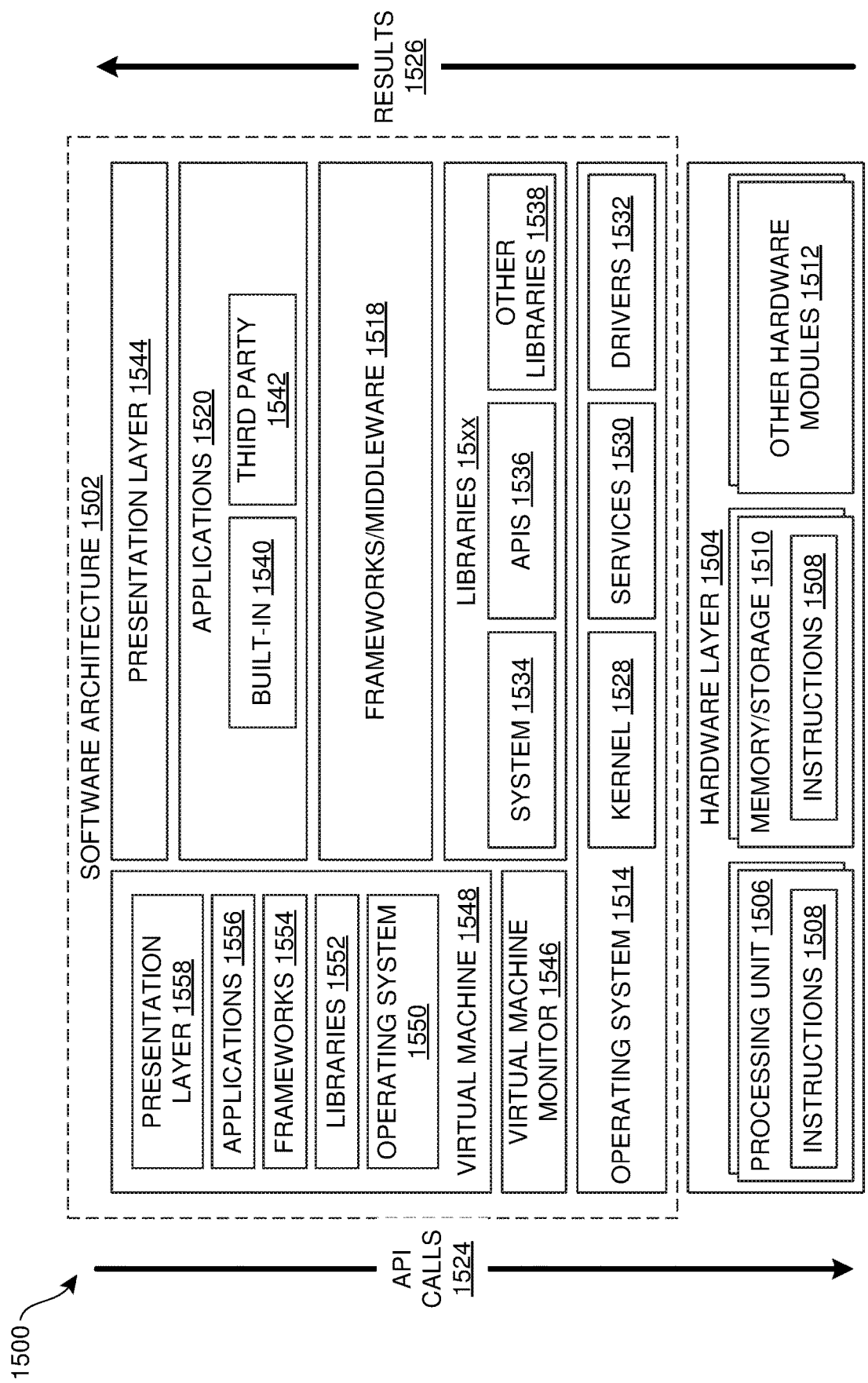
FIG. 15 is a block diagram of an example computing device, which may be used to provide implementations of the mechanisms described herein.

FIG. 15 is a block diagram 1500 illustrating an example software architecture 1502, various portions of which may be used in conjunction with various hardware architectures herein described, which may implement any of the above-described features. FIG. 15 is a non-limiting example of a software architecture and it will be appreciated that many other architectures may be implemented to facilitate the functionality described herein. The software architecture 1502 may execute on hardware such as the computing devices of FIGS. 1-13 that includes, among other things, document storage 1070, processors, memory, and input/output (I/O) components. A representative hardware layer 1504 is illustrated and can represent, for example, the computing devices of FIGS. 1-14. The representative hardware layer 1504 includes a processing unit 1506 and associated executable instructions 1508. The executable instructions 1508 represent executable instructions of the software architecture 1502, including implementation of the methods, modules and so forth described herein. The hardware layer 1504 also includes a memory/storage 1510, which also includes the executable instructions 1508 and accompanying data. The hardware layer 1504 may also include other hardware modules 1512. Instructions 1508 held by processing unit 1508 may be portions of instructions 1508 held by the memory/storage 1510.

The example software architecture 1502 may be conceptualized as layers, each providing various functionality. For example, the software architecture 1502 may include layers and components such as an operating system (OS) 1514, libraries 1516, frameworks 1518, applications 1520, and a presentation layer 1544. Operationally, the applications 1520 and/or other components within the layers may invoke API calls 1524 to other layers and receive corresponding results 1526. The layers illustrated are representative in nature and other software architectures may include additional or different layers. For example, some mobile or special purpose operating systems may not provide the frameworks/middleware 1518.

The OS 1514 may manage hardware resources and provide common services. The OS 1514 may include, for example, a kernel 1528, services 1530, and drivers 1532. The kernel 1528 may act as an abstraction layer between the hardware layer 1504 and other software layers. For example, the kernel 1528 may be responsible for memory management, processor management (for example, scheduling), component management, networking, security settings, and so on. The services 1530 may provide other common services for the other software layers. The drivers 1532 may be responsible for controlling or interfacing with the underlying hardware layer 1504. For instance, the drivers 1532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1516 may provide a common infrastructure that may be used by the applications 1520 and/or other components and/or layers. The libraries 1516 typically provide functionality for use by other software modules to perform tasks, rather than rather than interacting directly with the OS 1514. The libraries 1516 may include system libraries 1534 (for example, C standard library) that may provide functions such as memory allocation, string manipulation, file operations. In addition, the libraries 1516 may include API libraries 1536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1516 may also include a wide variety of other libraries 1538 to provide many functions for applications 1520 and other software modules.

The frameworks 1518 (also sometimes referred to as middleware) provide a higher-level common infrastructure that may be used by the applications 1520 and/or other software modules. For example, the frameworks 1518 may provide various graphic user interface (GUI) functions, high-level resource management, or high-level location services. The frameworks 1518 may provide a broad spectrum of other APIs for applications 1520 and/or other software modules.

The applications 1520 include built-in applications 1540 and/or third-party applications 1542. Examples of built-in applications 1540 may include, but are not limited to, a contacts application, a browser application, a location application, a media application, a messaging application, and/or a game application. Third-party applications 1542 may include any applications developed by an entity other than the vendor of the particular platform. The applications 1520 may use functions available via OS 1514, libraries 1516, frameworks 1518, and presentation layer 1544 to create user interfaces to interact with users.

Some software architectures use virtual machines, as illustrated by a virtual machine 1548. The virtual machine 1548 provides an execution environment where applications/modules can execute as if they were executing on a hardware machine (such as the machine 1000 of FIG. 10, for example). The virtual machine 1548 may be hosted by a host OS (for example, OS 1514) or hypervisor, and may have a virtual machine monitor 1546 which manages operation of the virtual machine 1548 and interoperation with the host operating system. A software architecture, which may be different from software architecture 1502 outside of the virtual machine, executes within the virtual machine 1548 such as an OS 1550, libraries 1552, frameworks 1554, applications 1556, and/or a presentation layer 1558.

Figure 16:
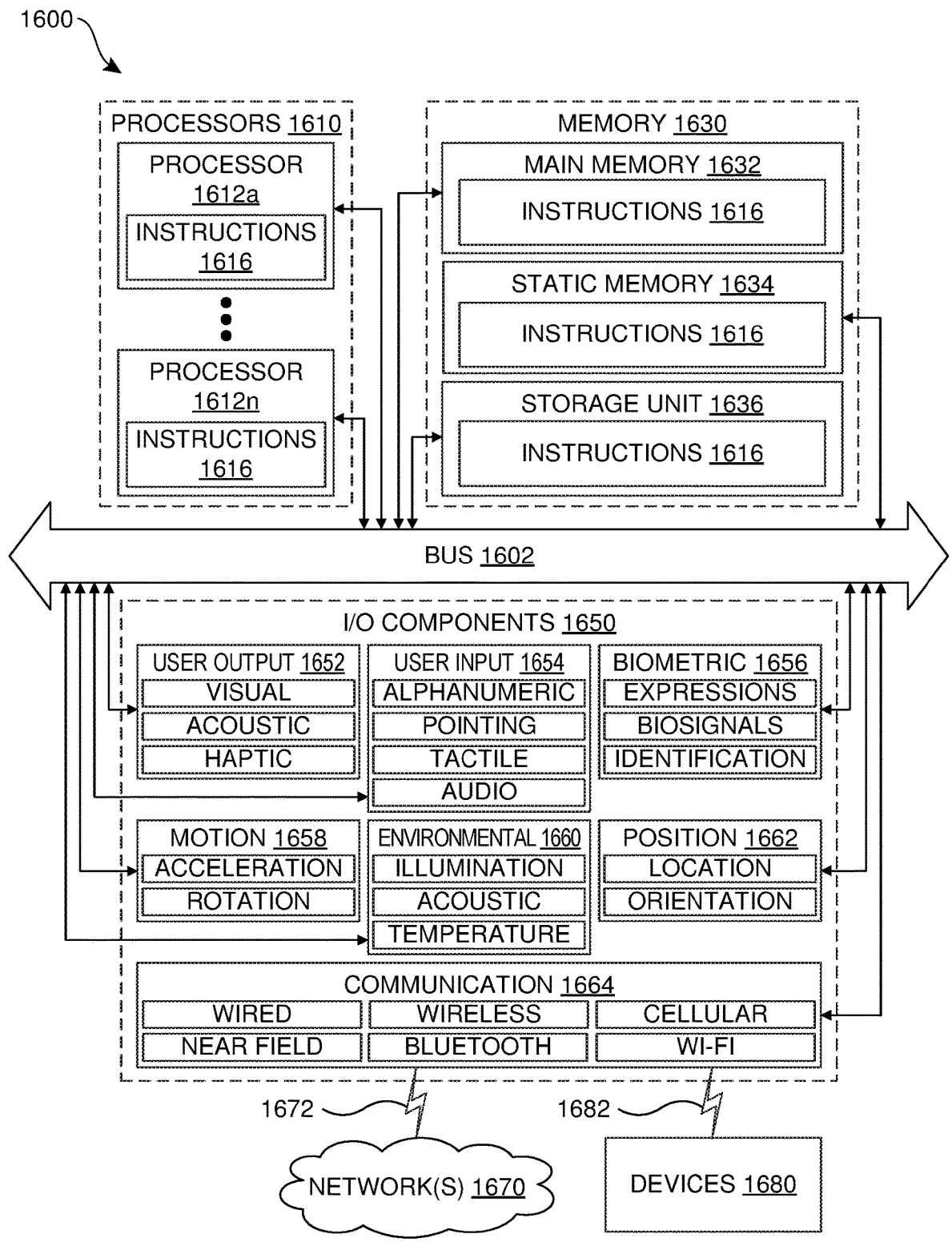
FIG. 16 is a block diagram illustrating components of an example machine configured to read instructions from a machine-readable medium.

FIG. 16 is a block diagram illustrating components of an example machine 1600 configured to read instructions from a machine-readable medium (for example, a machine-readable storage medium) and perform any of the features described herein. The example machine 1600 is in a form of a computer system, within which instructions 1616 (for example, in the form of software components) for causing the machine 1600 to perform any of the features described herein may be executed. As such, the instructions 1616 may be used to implement modules or components described herein. The instructions 1616 cause unprogrammed and/or unconfigured machine 1600 to operate as a particular machine configured to carry out the described features. The machine 1600 may be configured to operate as a standalone device or may be coupled (for example, networked) to other machines. In a networked deployment, the machine 1600 may operate in the capacity of a server machine or a client machine in a server-client network environment, or as a node in a peer-to-peer or distributed network environment. Machine 1600 may be embodied as, for example, a server computer, a client computer, a personal computer (PC), a tablet computer, a laptop computer, a netbook, a set-top box (STB), a gaining and/or entertainment system, a smart phone, a mobile device, a wearable device (for example, a smart watch), and an Internet of Things (IoT) device. Further, although only a single machine 1600 is illustrated, the term "machine" includes a collection of machines that individually or jointly execute the instructions 1616.

The machine 1600 may include processors 1610, memory 1630, and 110 components 1650, which may be communicatively coupled via, for example, a bus 1602. The bus 1602 may include multiple buses coupling various elements of machine 1600 via various bus technologies and protocols. In an example, the processors 1610 (including, for example, a central processing unit (CPU), a graphics processing unit (GPU), a digital signal processor (DSP), an ASIC, or a suitable combination thereof) may include one or more processors 1612a to 1612n that may execute the instructions 1616 and process data. In some examples, one or more processors 1610 may execute instructions provided or identified by one or more other processors 1610. The term "processor" includes a multi-core processor including cores that may execute instructions contemporaneously. Although FIG. 16 shows multiple processors, the machine 1600 may include a single processor with a single core, a single processor with multiple cores (for example, a multi-core processor), multiple processors each with a single core, multiple processors each with multiple cores, or any combination thereof. In some examples, the machine 1600 may include multiple processors distributed among multiple machines.

The memory/storage 1630 may include a main memory 1632, a static memory 1634, or other memory, and a storage unit 1636, both accessible to the processors 1610 such as via the bus 1602. The storage unit 1636 and memory 1632, 1634 store instructions 1616 embodying any one or more of the functions described herein. The memory/storage 1630 may also store temporary, intermediate, and/or long-term data for processors 1610. The instructions 1616 may also reside, completely or partially, within the memory 1632, 1634, within the storage unit 1636, within at least one of the processors 1610 (for example, within a command buffer or cache memory), within memory at least one of I/O components 1650, or any suitable combination thereof, during execution thereof. Accordingly, the memory 1632, 1634, the storage unit 1636, memory in processors 1610, and memory in I/O components 1650 are examples of machine-readable media.

As used herein, "machine-readable medium" refers to a device able to temporarily or permanently store instructions and data that cause machine 1600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1616) for execution by a machine 1600 such that the instructions, when executed by one or more processors 1610 of the machine 1600, cause the machine 1600 to perform and one or more of the features described herein. Accordingly, a "machine-readable medium" may refer to a single storage device, as well as "cloud-based" storage systems or storage networks that include multiple storage apparatus or devices.

The I/O components 1650 may include a wide variety of hardware components adapted to receive input, provide output, produce output, transmit information, exchange information, capture measurements, and so on. The specific I/O components 1650 included in a particular machine will depend on the type and/or function of the machine. For example, mobile devices such as mobile phones may include a touch input device, whereas a headless server or IoT device may not include such a touch input device. The particular examples of I/O components illustrated in FIG. 16 are in no way limiting, and other types of components may be included in machine 1600. The grouping of I/O components 1650 are merely for simplifying this discussion, and the grouping is in no way limiting. In various examples, the I/O components 1650 may include user output components 1652 and user input components 1654. User output components 1652 may include, for example, display components for displaying information (for example, a liquid crystal display (LCD) or a projector), acoustic components (for example, speakers), haptic components (for example, a vibratory motor or force-feedback device), and/or other signal generators. User input components 1654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1650 may include biometric components 1656 and/or position components 1662, among a wide array of other environmental sensor components. The biometric components 1656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1662 may include, for example, location sensors (for example, a Global Position System (GPS) receiver), altitude sensors (for example, an air pressure sensor from which altitude may be derived), and/or orientation sensors (for example, magnetometers).

The I/O components 1650 may include communication components 1664, implementing a wide variety of technologies operable to couple the machine 1600 to network(s) 1670 and/or device(s) 1680 via respective communicative couplings 1672 and 1682. The communication components 1664 may include one or more network interface components or other suitable devices to interface with the network(s) 1670. The communication components 1664 may include, for example, components adapted to provide wired communication, wireless communication, cellular communication. Near Field Communication (NEC), Bluetooth communication, and/or communication via other modalities. The device(s) 1680 may include other machines or various peripheral devices (for example, coupled via USB).

In some examples, the communication components 1664 may detect identifiers or include components adapted to detect identifiers. For example, the communication components 1664 may include Radio Frequency identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1662, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing device comprising:
   at least one processor; and
   one or more computer readable media including instructions which, when executed by the at least one processor, cause the at least one processor to:
      receive an image via an image scanning application;
      reduce a resolution of the image by down-scaling;
      detect a plurality of edges by applying an edge detection algorithm to the down-scaled image;
      based on the plurality of edges, automatically detect a plurality of quadrangle-shaped discrete candidate regions within the down-scaled image by identifying:
         corners where two edges of the plurality of edges intersect, and
         quadrangles representing discrete candidate regions that include the corners;
      identify a subset of the plurality of quadrangle-shaped discrete candidate regions, the subset including a first region and a second region;
      detect a capture initiating signal;
      capture, in response to the capture initiating signal, at least the first region and the second region in a substantially parallel process; and
      store at least a first image content corresponding to the first region and a second image content corresponding to the second region in a scanned images folder.

2. The device of claim 1, wherein the instructions further cause the at least one processor to:
   present a graphical user interface for accessing of stored image content; and
   present a first set of information for the first image content and a second set of information for the second image content on a device display.

3. The device of claim 1, wherein the instructions further cause the at least one processor to:
   present the image on a device display; and
   overlay at least a first perimeter of the first region with a first visual indicator, and overlay at least a second perimeter of the second region with a second visual indicator.

4. The device of claim 1, wherein the subset of the plurality of quadrangle-shaped discrete candidate regions further includes a third region; and wherein the instructions further cause the at least one processor to:
   receive a first input, associated with the third region, for deselecting the third region; and
   remove the third region from the subset of the plurality of quadrangle-shaped discrete candidate regions.

5. The device of claim 1, wherein the instructions further cause the at least one processor to:
   present the image on a device display as a first image preview; and
   distinguish each of the plurality of quadrangle-shaped discrete candidate regions in the first image preview by an overlay of a visual indicator on at least a portion of each region.

6. The device of claim 5, wherein the subset of the plurality of quadrangle-shaped discrete candidate regions further includes a third region; and wherein the instructions further cause the at least one processor to:

receive a first input, associated with the third region, for deselecting the third region; and remove the visual indicator overlaid on the third region.

7. The device of claim 1, wherein the instructions further cause the at least one processor to determine, prior to detecting the plurality of edges, whether pixels in the image are foreground pixels or background pixels by applying a segmentation algorithm to the pixels of the image, wherein the detecting of the plurality of edges is limited to only pixels of the image determined to be foreground pixels.

8. The device of claim 7, wherein the first region is oriented at a first orientation and the second region is oriented at a second orientation, and wherein the first orientation differs from the second orientation.

9. The device of claim 1, wherein a first area of the first region is larger than a second area of the second region.

10. The device of claim 1, wherein the instructions further cause the at least one processor to:
    partition the image into a plurality of segments via a clustering algorithm to produce a segmented image comprising a plurality of non-overlapping groups of pixels; and
    apply the edge detection algorithm to the segmented image;
    wherein the automatic detection of the plurality of quadrangle-shaped discrete candidate regions in the image is based at least on the application of the edge detection algorithm to the segmented image.

11. The data processing device of claim 1, wherein to automatically detect the plurality of quadrangle-shaped discrete candidate regions further comprises instructions to cause the at least one processor to:
    join edges from the plurality of edges to form the plurality of quadrangle-shaped discrete candidate regions.

12. A method comprising:
    receiving an image via an image scanning application;
    reducing a resolution of the image by down-scaling;
    detecting a plurality of edges by applying an edge detection algorithm to the down-scaled image;
    automatically detecting a plurality of quadrangle-shaped discrete candidate regions within the down-scaled image by forming the plurality of quadrangle-shaped discrete candidate regions based on the plurality of edges and by identifying:
        corners where two edges of the plurality of edges intersect, and
        quadrangles representing discrete candidate regions that include the corners;
    identifying a subset of the plurality of quadrangle-shaped discrete candidate regions, the subset including a first region and a second region;
    receiving a capture initiating signal;
    capturing, in response to the capture initiating signal, at least the first region and the second region in a substantially parallel process; and
    storing at least a first image content corresponding to the first region and a second image content corresponding to the second region in a scanned images folder.

13. The method of claim 12, further comprising:
    presenting a graphical user interface for accessing of stored image content; and
    presenting a first set of information for the first image content and a second set of information for the second image content on a device display.

14. The method of claim 12, further comprising:
    presenting the image on a device display; and
    overlaying at least a first perimeter of the first region with a first visual indicator, and overlaying at least a second perimeter of the second region with a second visual indicator.

15. The method of claim 12, wherein the subset of the plurality of quadrangle-shaped discrete candidate regions further includes a third region; and wherein the method further comprises:
    receiving a first input, associated with the third region, for deselecting the third region; and
    removing the third region from the subset of the plurality of quadrangle-shaped discrete candidate regions.

16. The method of claim 12, further comprising:
    presenting the image on a device display as a first image preview; and
    distinguishing each of the plurality of quadrangle-shaped discrete candidate regions in the first image preview by an overlay of a visual indicator on at least a portion of each region.

17. The method of claim 16, wherein the subset of the plurality of quadrangle-shaped discrete candidate regions further includes a third region; and wherein the method further comprises:
    receiving a first input, associated with the third region, for deselecting the third region; and
    removing the visual indicator overlaid on the third region.

18. The method of claim 12, further comprising determining, prior to detecting the plurality of edges, whether pixels in the image are foreground pixels or background pixels by applying a segmentation algorithm to the pixels of the image, wherein the detecting of the plurality of edges is limited to only pixels determined to be foreground pixels.

19. The method of claim 12, further comprising:
    partitioning the image into a plurality of segments via a clustering algorithm to produce a segmented image comprising a plurality of non-overlapping groups of pixels; and
    applying the edge detection algorithm to the segmented image;
    wherein automatically detecting the plurality of quadrangle-shaped discrete candidate regions in the image is based at least on the application of the edge detection algorithm to the segmented image.

20. A computer program product stored on a non-transitory computer-readable storage medium on which are stored instructions that, when executed, cause a processor of a programmable device to perform functions of:
    receiving an image via an image scanning application;
    reducing a resolution of the image by down-scaling;
    detecting a plurality of edges by applying an edge detection algorithm to the down-scaled image;
    automatically detecting a plurality of quadrangle-shaped discrete candidate regions within the down-scaled image by forming the plurality of quadrangle-shaped discrete candidate regions, based on the plurality of edges and by identifying:
        corners where two edges of the plurality of edges intersect, and
        quadrangles representing discrete candidate regions that include the corners;
    identifying a subset of the plurality of quadrangle-shaped discrete candidate regions, the subset including a first region and a second region;
    receiving a capture initiating signal;
    capturing, in response to the capture initiating signal, at least the first region and the second region in a substantially parallel process; and storing at least a first image content corresponding to the first region and a second image content corresponding to the second region in a scanned images folder.

\* \* \* \* \*